US012810474B2

(12) United States Patent
Lipunov et al.

(10) Patent No.: US 12,810,474 B2
(45) Date of Patent: Nov. 24, 2026

(54) SYSTEM AND METHOD FOR DETERMINING POSITION OF A MOVING OBJECT

(71) Applicant: Rapsodo Pte. Ltd., Singapore (SG)

(72) Inventors: Evgeny Lipunov, Singapore (SG); Baglan Aitu, Singapore (SG); Osman Murat Teket, Singapore (SG); Batuhan Okur, Singapore (SG)

(73) Assignee: Rapsodo Pte. Ltd., Singapore (SG)

( * ) Notice: Subject to any disclaimer, the term of this patent is extended or adjusted under 35 U.S.C. 154(b) by 0 days.

(21) Appl. No.: 19/436,800

(22) Filed: Dec. 30, 2025

(65) Prior Publication Data

US 2026/0127765 A1 May 7, 2026

Related U.S. Application Data

(60) Continuation-in-part of application No. 18/802,634, filed on Aug. 13, 2024, which is a division of application No. 18/595,592, filed on Mar. 5, 2024, now Pat. No. 12,118,750.

(51) Int. Cl.

| | |
|---|---|
| ***G06T 7/80*** | (2017.01) |
| ***G06T 7/292*** | (2017.01) |
| ***G06T 7/70*** | (2017.01) |
| ***H04N 17/00*** | (2006.01) |
| ***H04N 23/60*** | (2023.01) |

(52) U.S. Cl.

CPC ................ *G06T 7/80* (2017.01); *G06T 7/292* (2017.01); *G06T 7/70* (2017.01); *H04N 17/002* (2013.01); *H04N 23/60* (2023.01); *G06T 2207/30241* (2013.01)

(58) Field of Classification Search

None

See application file for complete search history.

(56) References Cited

U.S. PATENT DOCUMENTS

| | | | |
|---|---|---|---|
| 8,335,345 | B2 | 12/2012 | White et al. |
| 8,339,459 | B2 | 12/2012 | Zhang et al. |
| 8,705,799 | B2 | 4/2014 | White et al. |
| 12,036,442 | B1 | 7/2024 | Tannar |

(Continued)

OTHER PUBLICATIONS

Office Action dated Jan. 22, 2026 received in U.S. Appl. No. 18/802,634, 22 pages.

(Continued)

*Primary Examiner* — Edemio Navas, Jr.

(74) *Attorney, Agent, or Firm* — Scully, Scott, Murphy & Presser, P.C.

(57) ABSTRACT

An image of an object is received, the image being captured by a camera. Two-dimensional (2D) image points on perimeters of the object in the image are determined. Using a rotation component of a homography matrix, the 2D image points are converted into corresponding three-dimensional (3D) points on a 3D conic section that passes through a center of the camera and the perimeters of the object. The 3D points on the 3D conic section are normalized. A principal direction to a center of the object is determined, based on the normalized 3D points on the 3D conic section. 2D object center is determined based on the principal direction and the rotation component of the homography matrix.

23 Claims, 11 Drawing Sheets

(56) References Cited

U.S. PATENT DOCUMENTS

| | | | |
|---|---|---|---|
| 2006/0159308 | A1 | 7/2006 | Hampapur et al. |
| 2017/0333777 | A1 | 11/2017 | Spivak et al. |
| 2018/0184078 | A1 | 6/2018 | Shivalingappa et al. |
| 2019/0066334 | A1 | 2/2019 | Gu et al. |
| 2019/0073792 | A1* | 3/2019 | Fletcher ................. G01C 11/00 |
| 2019/0120963 | A1 | 4/2019 | Korkalo et al. |
| 2019/0266755 | A1 | 8/2019 | White et al. |
| 2020/0026941 | A1 | 1/2020 | Tan et al. |
| 2020/0279483 | A1* | 9/2020 | Eather .................... G06V 20/52 |
| 2021/0174599 | A1* | 6/2021 | Kurabayashi ........... A63F 13/98 |
| 2021/0217196 | A1 | 7/2021 | Shimamura et al. |
| 2022/0324679 | A1 | 10/2022 | Benzing et al. |
| 2023/0081593 | A1 | 3/2023 | Caulfield et al. |
| 2023/0260363 | A1 | 8/2023 | Bulzacki et al. |
| 2024/0310851 | A1 | 9/2024 | Ebrahimi Afrouzi et al. |

OTHER PUBLICATIONS

Wikipedia, “Scheimpflug principle”, https://en.wikipedia.org/wiki/Scheimpflug_principle, Page last edited Sep. 28, 2023, Printed on Mar. 4, 2024, 6 pages.

* cited by examiner

SYSTEM AND METHOD FOR DETERMINING POSITION OF A MOVING OBJECT

CROSS REFERENCE TO RELATED APPLICATIONS

This application is a continuation-in-part application of U.S. patent application Ser. No. 18/802,634 filed Aug. 13, 2024, which is a divisional application of U.S. patent application Ser. No. 18/595,592, filed Mar. 5, 2024 (now U.S. patent Ser. No. 12/118,750), the entire contents of which are incorporated by reference herein.

TECHNICAL FIELD

The present disclosure relates to a camera calibration method and a method and system of using a calibrated camera(s) for tracking and measuring a motion of a target object in a three-dimensional space.

BACKGROUND

Fundamentally, a camera provides an image mapping of a three-dimensional space onto a two-dimensional space or image plane. Current camera calibration techniques supply model parameter values that are needed to compute line of sight rays in space that corresponds to a point in the image plane.

A calibration or "projection" matrix, which is estimated during a camera calibration, is typically decomposed into eleven geometric parameters that define the standard pinhole camera model. Typically, camera model parameters include extrinsic and intrinsic parameters. The extrinsic camera parameters include 3D location and orientation of a camera in the world and intrinsic camera parameters include, among others, a focal length and relationships between pixel coordinates and camera coordinates.

In many applications, camera calibration is necessary to recover 3D quantitative measures about an observed scene from 2D images. For example, from a calibrated camera, it can be determined how far an object is from the camera, or the height of the object, etc. Typical calibration techniques use a 3D, 2D or 1D calibration object whose geometry in 3D space is known with very good precision.

From a set of world points and their image coordinates, one object of the camera calibration is to find a projection "matrix" and subsequently find intrinsic and extrinsic camera parameters from that matrix in a decomposition step. However, the decomposition into extrinsic and intrinsic camera parameters is one of the major issues in calibration due to reprojection error. Further, in the decomposition step, to extract the extrinsic and intrinsic camera parameters, several assumptions and constraints are made, which might be not true, for e.g., no lens distortion or no tilt.

Accordingly, it is desirable to have a camera calibration method that does not require decomposition into intrinsic and extrinsic camera parameters. In addition, it is also desirable to have a camera system for taking measurements that avoids having to make any assumptions regarding intrinsic or extrinsic camera parameters.

SUMMARY

There is provided a camera system and method for taking measurements of a moving object that avoids having to make any assumptions regarding intrinsic camera parameters.

Further, there is provided a camera system and method for taking measurements of a moving object that avoids having to split camera parameters apart from the camera's calibration matrix and as a result, the camera is ready to work with any lenses, any shift or tilt (intentionally or unintentionally) in the setup of the camera for tracking object in motion.

Additionally, there is provided a camera system calibration method for calibrating a camera used in taking measurements of a moving object without the decomposition of camera parameters into extrinsic and intrinsic parts.

In an embodiment, the camera system and method include a single camera device.

In one embodiment, during the calibration process, a virtual reference is aligned to a physical object in a global reference space to obtain the camera parameters.

A robust camera calibration system and method and system whereby a user can use any camera without the need for fine tuning the camera parameters to a global reference.

According to one aspect, there is provided a method for tracking an object in motion. The method comprises: capturing, from each of one or more calibrated cameras, one or more image frames of an object in motion, each of the one or more calibrated cameras having been calibrated according to a calibration method that generates and uses a respective transformation matrix for mapping three-dimensional (3D) real world model features to corresponding two-dimensional (2D) image features; and determining, using a hardware processor, motion characteristics of the object in motion based on the captured one or more image frames from each of the one or more calibrated cameras, the determining of motion characteristics based on implicit intrinsic camera parameters and implicit extrinsic camera parameters of the respective transformation matrix from each respective one or more calibrated cameras.

In a further aspect, there is provided an object tracking system. The object tracking system includes a camera system comprising one or more calibrated cameras, each camera capturing one or more image frames of a position of an object in motion, each of the one or more calibrated cameras having been calibrated according to a calibration method that generates and uses a respective transformation matrix for mapping three-dimensional (3D) real world model features to corresponding two-dimensional (2D) image features; and a hardware processor coupled to a memory storing instructions that, when executed by the processor, configure the hardware processor to determine motion characteristics of the object based on the captured one or more image frames, the determining of motion characteristics of the object is based on implicit intrinsic camera parameters and implicit extrinsic camera parameters of the respective transformation matrix from each respective one or more calibrated cameras.

In accordance with a further aspect, there is provided a method of calibrating a camera. The method includes providing a transformation matrix (H) that represents a plurality of camera parameters; and aligning 2D image features (q) with 2D image features of a reference feature (q') by applying one or more corrections ($H_\Delta$) to the plurality of the implicit camera parameters of the transformation matrix to obtain an updated transformation matrix (H'), thereby calibrating the camera, wherein the 2D image features (q) and 2D image features of the reference (q') are represented in pixel coordinates.

Further to this aspect, the plurality of the camera parameters includes implicit extrinsic and implicit intrinsic camera parameters and further, the camera is calibrated without decomposing the plurality of the implicit camera parameters into explicit extrinsic and explicit intrinsic camera parameters.

Further to this aspect, the method of calibrating the camera includes modifying one or more implicit extrinsic camera parameters. The modifying comprises adjusting implicit extrinsic parameters through an affine correction. The affine correction recovers 6 Degrees of Freedom (DoF) representing the explicit extrinsic camera parameters.

In some embodiments, an apparatus can include at least one memory device and at least one processor coupled with the memory device. The processor can be configured to receive an image of an object, the image being captured by a camera. The processor can also be configured to determine two-dimensional (2D) image points on perimeters of the object in the image. The processor can also be configured to convert using a rotation component of a homography matrix, the 2D image points into corresponding three-dimensional (3D) points on a 3D conic section that passes through a center of the camera and the perimeters of the object. The processor can also be configured to normalize the 3D points on the 3D conic section. The processor can also be configured to determine a principal direction to a center of the object, based on the normalized 3D points on the 3D conic section. The processor can also be configured to determine 2D object center based on the principal direction and the rotation component of the homography matrix.

In some embodiments, a method performed by a least one processor is provided. The method includes receiving an image of an object, the image being captured by a camera. The method also includes determining two-dimensional (2D) image points on perimeters of the object in the image. The method also includes converting using a rotation component of a homography matrix, the 2D image points into corresponding three-dimensional (3D) points on a 3D conic section that passes through a center of the camera and the perimeters of the object. The method also includes normalizing the 3D points on the 3D conic section. The method also includes determining a principal direction to a center of the object, based on the normalized 3D points on the 3D conic section. The method also includes determining 2D object center based on the principal direction and the rotation component of the homography matrix.

A computer readable storage medium storing a program of instructions executable by a machine to perform one or more method described herein is also provided.

Further features as well as the structure and operation of various embodiments are described in detail below with reference to the accompanying drawings. In the drawings, like reference numbers indicate identical or functionally similar elements.

DETAILED DESCRIPTION OF THE EMBODIMENTS

Figure 1:
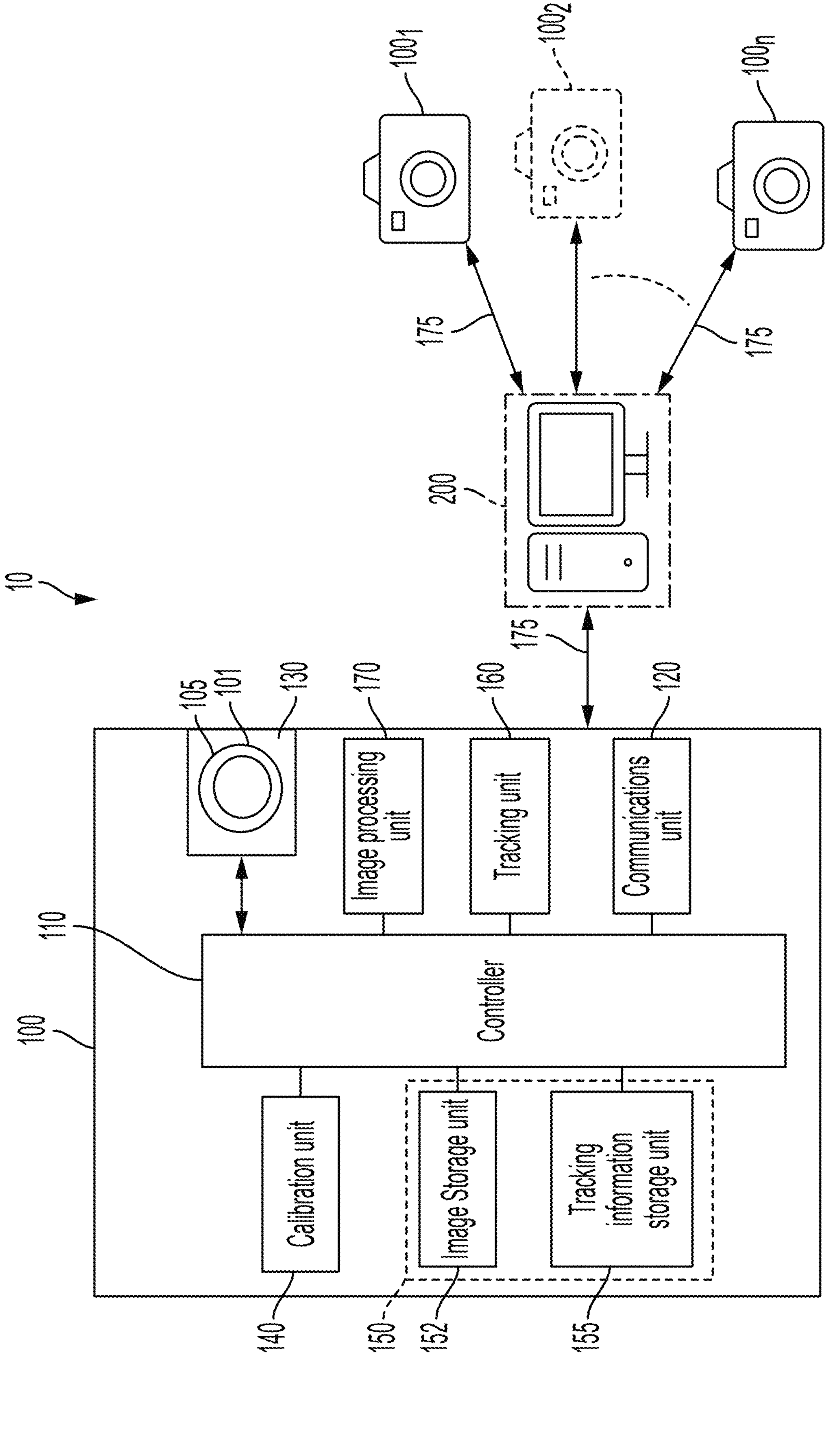
FIG. 1 is an exemplary diagram of an object measurement apparatus employing a plurality of camera devices calibrated in accordance with methods of the present disclosure.

Notably, technical terms used in the present specification are only for describing specific embodiments and are not intended to impose any limitation on the scope of the present disclosure. In addition, the term used in the present specification, although expressed in the singular, is construed to have a plural meaning, unless otherwise meant in context. The phrase "is configured with," "include," or the like, which is used in the present specification, should not be construed as being used to necessarily include all constituent elements or all steps that are described in the specification, and should be construed in such a manner that, among all the constituent elements or among all the steps, one or several constituent elements or one or several steps, respectively, may not be included, or that one or several other constituent elements, or one or several other steps may be further included.

In addition, in a case where it is determined that a detailed description of the well-known technology in the relevant art to which the present disclosure pertains makes indefinite the nature and gist of the technology disclosed in the present disclosure, the detail description thereof is omitted from the present specification.

As referred to herein, camera calibration is the process of obtaining camera parameters in the form of extrinsic and/or intrinsic parameters. Methods typically employed in the camera calibration include but are not limited to 3D Direct Linear Transformation (DLT), QR decomposition and perspective n point (PnP). A 3D DLT calibration obtains a homography or transformation matrix. The QR decomposition splits homography matrix into the extrinsic matrix and intrinsic matrix (of specific intrinsic model). The PnP such as P3P where n=3, obtains extrinsic camera parameters only, assuming intrinsic parameters are already known. Camera calibration method may use prior calibration results by the same or a different method. With prior information, camera parameters may be evaluated iteratively for e.g. using gradient descent (GD), from defaults to the ground truth.

As further referred to herein, DLT is one method for mono camera calibration, with its first step to recover the homography matrix H according to equation (1) as follows:

$$H = \{h_{xx}, h_{xy}\, h_{xz}; h_{yx}, h_{yy}, h_{yz}; h_{zx}, h_{zy}, h_{zz}; h_x, h_y\, h_z\} \tag{1}$$

from a calibration pattern, a set of feature points $\vec{p}=\{p_x,p_y,p_z\}$ with known, predefined positions in 3D world, and from image points $\vec{q}=(q_x,q_y,1)$ as a solution of the following equations: $\vec{p}H\propto\vec{q}$ or $\vec{p}H\times\vec{q}=0$ or according to equation (2) as:

$$q_x = \frac{p_x h_{xx} + p_y h_{yx} + p_z h_{zx} + h_x}{p_x h_{xz} + p_y h_{yz} + p_z h_{zz} + h_z};\; q_y = \frac{p_x h_{xy} + p_y h_{yy} + p_z h_{zy} + h_y}{p_x h_{xz} + p_y h_{yz} + p_z h_{zz} + h_z} \tag{2}$$

To solve the system of equations above, this relation is rearranged into the form: Ah=0 where A is built by eq. 1 from a set of 3D points $$\vec{p_n}$$

and a set of corresponding 2D image points $$\vec{q_n},$$

and $h=\{h_{xx};h_{yx};h_{zx};h_x;h_{yx};h_{yy};h_{yz};h_y;h_{zx};h_{zy};h_{zz};h_z\}$ is the vector of unknown H matrix elements. Then, a suitable optimization method can be applied, for e.g., least mean square (LMS), single value decomposition (SVD) or gradient descent (GD) and the system of equations is solved up to the scale, i.e. with 12−1=11 DoF.

As further referenced herein, PnP uses a set of methods for camera pose estimation, e.g., 6 DoF extrinsic parameters, assuming intrinsic parameters are given or known such as may be the case when the camera has been prior "calibrated". For this reason, PnP is not considered a complete calibration method since the intrinsic parameters are assumed. A minimum number of 3D points for camera pose estimation is three (e.g., P3P, three pairs of correspondences). As decomposition is not applied in the method for calibrating camera described in the current disclosure, PnP including P3P is not used in a factory calibration step. In some embodiments, the PnP or P3P is therefore used in a field calibration step only. That is affine corrections are applied to the default homography matrix, formally for the "uncalibrated" or "partially calibrated" camera, with intrinsic parameters unknown explicitly and hidden within the homography matrix.

As referred to herein, an "uncalibrated" or a "partially calibrated" camera is a camera for which pose estimation is either unknown or incomplete. In some embodiments, the pose estimation includes camera orientation $R^T$ and camera position $-sR^T$. In some embodiments, a homography matrix without the decomposition may provide an incomplete pose estimation, for e.g. position only, but not the orientation. Camera orientation is typically defined by optical axis. However, the optical axis is an intrinsic camera parameter (such as principal points: $c_x$, $c_y$).

Camera position is the translation part of a transform T placing the camera from its own coordinate system into the world coordinate system. Extrinsic camera matrix C is the inverse of transform matrix T according to equation (3) as follows:

$$T = C^{-1} = \{R; s\}^{-1} = \{R^T; -sR^T\} \tag{3}$$

Based on the above equation, camera position $p_c$ obtained from extrinsic camera matrix C is: $p_c=-sR^T$. In some embodiments, the camera position $p_c$ may also be obtained from translation part from the inverse of the homography matrix H (without decomposition). Hence, the camera position $p_c=-sR^T$ is considered to be independent from the intrinsic matrix K.

As described herein, decomposition of intrinsic and extrinsic camera parameters is the process of splitting the homography matrix H having 11 DoF into extrinsic C (6 DoF) and intrinsic K (5 DoF) parts: H={R;s}K.

The decomposition of camera parameters into extrinsic and intrinsic parts has an ambiguity as the decomposition gives rise to multiple possible solutions, for e.g., four—for QR decomposition for a given intrinsic model: $H=C_nK_n$.

As used herein, "QR decomposition" decomposes "rotational" part (RK) of the homography matrix H into an orthonormal rotation matrix and a lower (or upper) triangular.

Applying different intrinsic models $K_m$ may lead to even more distinctive solutions. One intrinsic model may be converted into any other models by applying rotation matrix R according to the following equation (4):

$$H = C_1K_1 = (C_1, R_{12})(R_{12}^T K_1) = C_2K_2 \tag{4}$$

where $K_1$ is a first intrinsic model and $K_2$ is a second intrinsic model, respectively with $R_{12}$ is the rotation matrix for converting $K_1$ to $K_2$. By keeping the same original homography matrix H intact, distinct intrinsic models lead to distinct camera orientation R. In some embodiments, the camera position may remain the same $p_c=-sR^T$, irrespective of the intrinsic model K applied.

As described herein, the homography matrix H is a 4×3 matrix, defined up to an arbitrary scale. Thus, the homography matrix H has 11 DoF. Homography matrix H is the product of extrinsic matrix C and intrinsic matrix K as defined according to the following equation (5):

$$H = CK \text{ where } C = \{R; s\} \text{ so that } H = \{RK; sK\} \tag{5}$$

The homography matrix H that maps 3D points $\vec{p}=\{p_x,p_y,p_z\}$ to 2D image points $\vec{q}=\{q_x,q_y,1\}$ as:

$$\vec{q} = \{q_x, q_y, 1\} \text{ as: } \vec{p_n}H \propto \vec{q_n} \text{ (up to scale, proportional to)}$$

(up to scale, proportional to) including projection into an image plane. In some embodiments, the homography matrix H is the result of the 3D DLT method. While DLT is one method, other suitable methods may be used including methods as proposed by: Richard Hartley & Andrew Zisserman, "Multiple View Geometry in Computer Vision", page 88.

As described herein, the extrinsic camera matrix C is a 4×3 matrix. Matrix C comprises a rotation matrix R and a translation vector s:C={R;s}. The extrinsic camera matrix C has six independent parameters (6 DoF) i.e. 3 DoF for the rotation and 3 DoF for the translation. The extrinsic camera matrix C maps 3D points from the world 3D coordinate system to the camera 3D coordinate system, without applying a projection onto the image plane.

The intrinsic camera matrix K is a 3×3 matrix. It comprises, among others, inner parameters of the camera such as: focal length, principal axis (shift), and tilts. The intrinsic camera matrix K may be represented according to equation (6) or (7) as:

$$K = \{f_x, 0, 0; s, f_y, 0; c_x, c_y, 1\} \text{ ("astigmatic – skew" model)} \quad (6)$$

or $$K = \{f, 0, t_x; 0, f, t_y; c_x, c_y, 1\} \text{ ("tilt – shift" model)} \quad (7)$$

The intrinsic camera matrix K has five independent parameters (5 DoF).

A 3D rotation matrix "R", a 3×3 orthonormal matrix, as used herein, is the component of a general 3D transform T or the extrinsic camera matrix $C=T^{-1}$. Rotation matrix "R" holds 3 independent parameters (3 DoF). Other equivalent representations of 3D rotation include axis-angle and unit quaternion, all having 3 DoF.

A translation vector "s", a 3D vector, as used herein, is the component of the general 3D transform T or the extrinsic camera matrix $C=T^{-1}$. Translation vector "s" holds 3 independent parameters (3 DoF).

As referred to herein, Degrees of Freedom (DoF) refers to the number of independent parameters, possibly hidden. For example: rotation matrix, quaternion and the angle for axis-angle 3D rotation representation, each has 3 DoF.

As referred to herein and described in the present disclosure, camera calibration is the process of obtaining camera parameters in the form of extrinsic and/or intrinsic parameters. In some embodiments, the camera calibration comprises a multiple steps process as will be described below. In some embodiments, the camera calibration comprises 2-steps calibration with a first step being referred to as a factory calibration and second step being referred to as a field calibration. In accordance with aspects of the present disclosure, the factory calibration is typically applied at least once for the camera to obtain a transformation matrix H representing a plurality of camera parameters. The plurality of camera parameters comprises intrinsic camera parameters and extrinsic camera parameters. In some embodiments, the transformation matrix H is for mapping 3D real world model features to corresponding 2D image features. In some embodiments, the transformation matrix is a homography matrix H. In some embodiments, the transformation matrix H represents intrinsic and extrinsic camera parameters. In some embodiments, the transformation matrix represents implicit intrinsic and implicit extrinsic camera parameters. In some embodiments, the transformation matrix may be obtained by DLT method as will be described below or other suitable algorithms. In some embodiments, the field calibration step may be applied once or multiple times. In some embodiments, the field calibration may be referred to as a calibration correction for the extrinsic camera parameters. In some embodiments, the second step is for correcting the extrinsic camera parameters implicitly, within the homography matrix H, without the decomposition of the intrinsic and extrinsic camera parameters. The field calibration may employ PnP algorithm including P3P, using the homography matrix H obtained from the first step or factory calibration as an initial estimation. Therefore, in the field calibration, only affine transform corrections are applied without altering intrinsic camera parameters defined implicitly within the homography matrix H.

FIG. 1 is an exemplary diagram of an object measurement apparatus 10 employing a plurality of camera devices $\mathbf{100}_1$, $\mathbf{100}_2$, . . . , $\mathbf{100}_n$ calibrated in accordance with methods of the present disclosure. Each of the plurality of camera devices are capable of wired or wireless communication with a computing device 200 for performing object tracking and parameter measuring operations.

Each camera device, such as the exemplary camera device 100 shown in FIG. 1, according to the embodiment of the present disclosure, may include at least components such as: a lens 101 and sensor 105, a digital signal processor or controller 110, which can include one or more hardware microprocessors, a communication unit 120 that is connected to and controlled by the controller 110, an image capture unit 130 for capturing images and/or video, a calibration unit 140 for controlling camera calibration operations, a memory 150, and a tracking unit 160.

Exemplary camera device 100 as depicted in FIG. 1, in connection with embodiments of the present disclosure, may include any device, system, component, or collection of components configured to capture images and/or video. In an embodiment, the camera device 100 includes an image capture unit 130 having optical elements such as, for example, lenses 101, filters, etc., and at least one image sensor 105 upon which an image may be recorded. Such an image sensor 105 may include any device that converts an image represented by incident light into an electronic signal. The image sensor 105 may include a plurality of pixel elements, which may be arranged in a pixel array (e.g., a grid of pixel elements) for acquiring an Image. For example, the image sensor 105 may comprise a charge-coupled device (CCD) or complementary metal-oxide-semiconductor (CMOS) image sensor. The pixel array may include a two-dimensional array with any aspect ratio. The image sensor 105 may be optically aligned with various optical elements that focus light onto the pixel array, for example, lens 101. Any number of pixels may be included such as, for example, hundreds or thousands of megapixels, etc.

In an embodiment, the image capture unit 130 acquires an image under the control of the controller 110, and the acquired image is stored in the memory storage unit 150 under the control of the controller 110. Further data and information for operation of the camera 100 can be stored in the memory 150. Then, the image acquired in the image capture unit 130 is stored in the memory 150. The acquired images have respective pieces of unique identification information, and the pieces of identification information can correspond to points of time, respectively, at which the images are acquired. In addition, other types of tracking information that are detected from at least one image according to the target designation information can be stored in the memory 150. A storage area of the memory 150, in which the images are stored, can be hereinafter alternatively referred to as an image storage unit 152, and a storage area of the memory 150, in which "tracking information" associated with target object tracking are stored, is hereinafter referred to as a tracking information storage unit 155. The camera memory 150 additionally stores local camera calibration information such as the value of extrinsic and intrinsic parameters used for camera calibration. In some embodiments, the camera memory 150 may also store the value of extrinsic and intrinsic camera parameters obtained from the camera calibration.

An image processing unit 170 is further provided to perform types of digital signal processing to raw camera image data, e.g., filtering, noise reduction, image sharpening, etc.

As further shown in FIG. 1, exemplary camera 100 can include a communication unit 120 to enable the camera to receive remote control signals for performing camera operations in connection with object tracking and measuring movement parameters and includes at least one module for performing wired and/or wireless communication with a remote controller processor or remote computing apparatus 200 (remote control unit). The communication unit 120 receives a control signal from a remote control apparatus through at least such one module and can transfer an acquired image to the remote controller processor or computing apparatus 200 under the control of the controller 110.

Whether remotely or locally controlled using controller 110, the camera 100 may operate at certain frame rates or be able to capture a certain number of images in a given time. The camera 100 may operate at a frame rate of greater than or equal to about sixty frames per second (fps), for example between about one hundred and about three hundred frames per second (fps). In some embodiments, a smaller subset of the available pixels in the pixel array may be utilized to allow for the camera to operate at a higher frame rate.

The tracking unit 160 operates to detect a target that corresponds to a received target object being tracked. In some embodiments, the target comprises a ball used in golf, cricket, baseball, softball, tennis, etc.

In an embodiment, any number of a variety of triggers may be used to cause the exemplary camera 100 to capture one or more images of the moving object. By way of non-limiting examples, the camera 100 may be triggered upon receipt of a timed activation signal, or when the moving object is detected, known or estimated to be in the field of view of the camera, or when the moving object first begins or modifies its flight (for example when a baseball is pitched, when a baseball is batted, when a golf ball is struck, when a tennis ball is served, when a cricket ball is bowled, etc.), or when a moving object is detected at a leading row of pixels in the pixel array, etc.

In an embodiment, the remote controller processor or computing apparatus 200 can control overall operation of the remote cameras 100, $\mathbf{100}_1$, $\mathbf{100}_2$, . . . , $\mathbf{100}_n$ that can be physically spaced apart to perform object tracking and measurements according to the embodiment of the present disclosure. The computing apparatus 200 can control the image capture unit 130 according to the control signals 175 that is received through the communication unit 120 and to configure the controller 110 to acquire an image. Subsequently, the controller 110 can store the acquired image at the device and/or can transmit the stored image and the related image identification and tracking information to the computing apparatus 200 for further processing. The further processing can include the application of one or more algorithms to receive raw camera image data in a series of image frames. For example, in accordance with embodiments herein, an example camera measurement of a moving object may include, but is not limited to identifying, in each of the images, one or more of: a radius of the object, a center of the object, a velocity, an elevation angle, and an azimuth angle, e.g., calculated based on the radius of the object, the center of the object, and any pre-measured camera alignment values.

Figure 2:
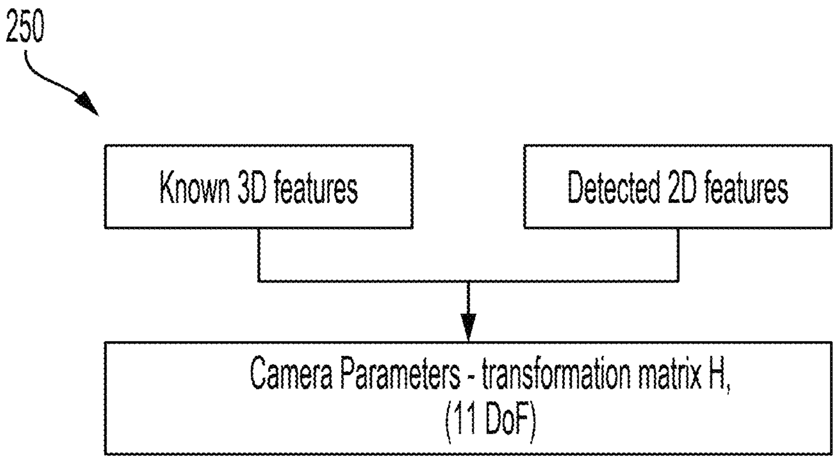
FIG. 2 depicts an application of the present disclosure to perform a mono camera calibration method without performing a decomposition to extract intrinsic and extrinsic camera parameters according to an embodiment.

In accordance with embodiments herein, FIG. 2 depicts implementation of the method described in the present disclosure using calibration unit 140 to perform a factory camera calibration method 250 i.e. first step of camera calibration. In some embodiments, the factory calibration 250 is performed using given known 3D features and detected 2D images features from the camera thereby generating the transformation matrix H. Such transformation matrix may be termed as "default" transformation matrix. As described herein, the transformation or projection matrix H represents intrinsic and extrinsic camera parameters having 11 DoF. As can be seen from FIG. 2, the factory calibration is undertaken without performing a decomposition to extract intrinsic and extrinsic camera parameters explicitly. In some embodiments, following the factory calibration, the camera may undergo a further calibration i.e. field calibration prior to using the calibrated camera. Hence, in some embodiments, the camera that has been calibrated following the factory calibration may be still considered as an "uncalibrated" camera. In some embodiments, the camera that has been calibrated following the factory calibration refers to a "partially calibrated" camera.

Figure 3:
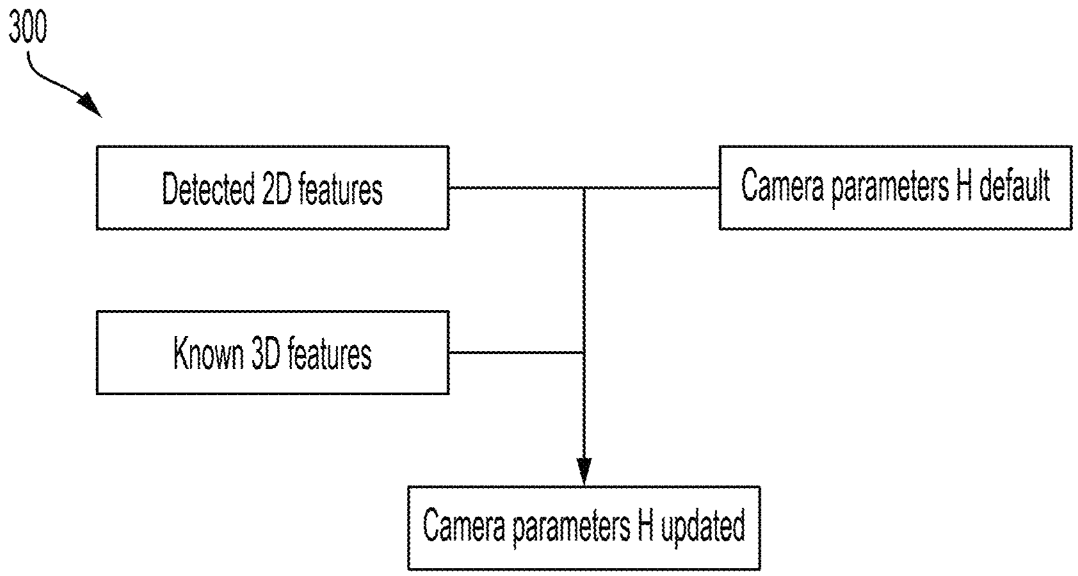
FIG. 3 depicts an application of the present disclosure to perform a field camera calibration method, including the generating of an updated matrix H' by providing an affine correction (extrinsic camera parameter)

In accordance with further embodiments herein, FIG. 3 depicts an application of the present disclosure to perform a field calibration method 300. In some embodiments, the field calibration refers to a second step of the camera calibration described in the present disclosure. In some embodiments, as described above, the field calibration refers to a method 300 for calibrating an 'uncalibrated' camera or a "partially calibrated" camera. In some embodiments, the field calibration is performed based on given known 3D features and detected 2D images features from the camera, and given default camera parameters from transformation matrix H, where the transformation matrix H is obtained from the first step of calibration i.e., factory calibration (refer to FIG. 2). In some embodiments, the calibration unit 140 performs a method to generate an updated correction matrix H' by performing affine correction to obtain updated extrinsic camera parameters. Thus, it is the case that the calibration method comprising the factory calibration and field calibration described herein advantageously is performed without decomposition of the intrinsic and extrinsic camera parameters. Accordingly, the accuracy of the calibration method described herein is advantageously better than the decomposition method as no assumption was made.

In some embodiments, there is provided a method for tracking an object in motion. The tracking method includes capturing, from each of one or more calibrated cameras, one or more image frames of the object in motion. In some embodiments, each of the one or more calibrated cameras may have been calibrated according to a calibration method described herein. In some embodiments, the calibration generates and uses a respective transformation matrix for mapping 3D real world model features to corresponding 2D image features. The tracking method further comprises determining, using a hardware processor, motion characteristics of the object in motion based on the captured one or more image frames from each of the one or more calibrated cameras. In some embodiments, the determining of motion characteristics is based on implicit intrinsic camera parameters and implicit extrinsic camera parameters of the respective transformation matrix from each respective one or more calibrated cameras. In some embodiments the tracking is a 3D tracking.

In some embodiments, each of the one or more calibrated cameras is calibrated without decomposing the plurality of the camera parameters into explicit extrinsic and explicit intrinsic camera parameters. In some embodiments, each of the first calibration (factory calibration) and the second calibration (field calibration) is performed without the decomposition of the camera parameters into explicit extrinsic and explicit intrinsic camera parameters. In some embodiments, both the first calibration step i.e. factory calibration and the second step calibration i.e. field calibration are performed without the decomposition of the camera parameters into extrinsic and intrinsic camera parameters.

In some embodiments, following the first step or factory calibration, each of the one or more calibrated cameras is further calibrated by modifying one or more implicit extrinsic camera parameters to obtain the explicit extrinsic camera parameters. In some embodiments, the modifying step comprises adjusting implicit extrinsic camera parameters through an affine correction.

Figure 4:
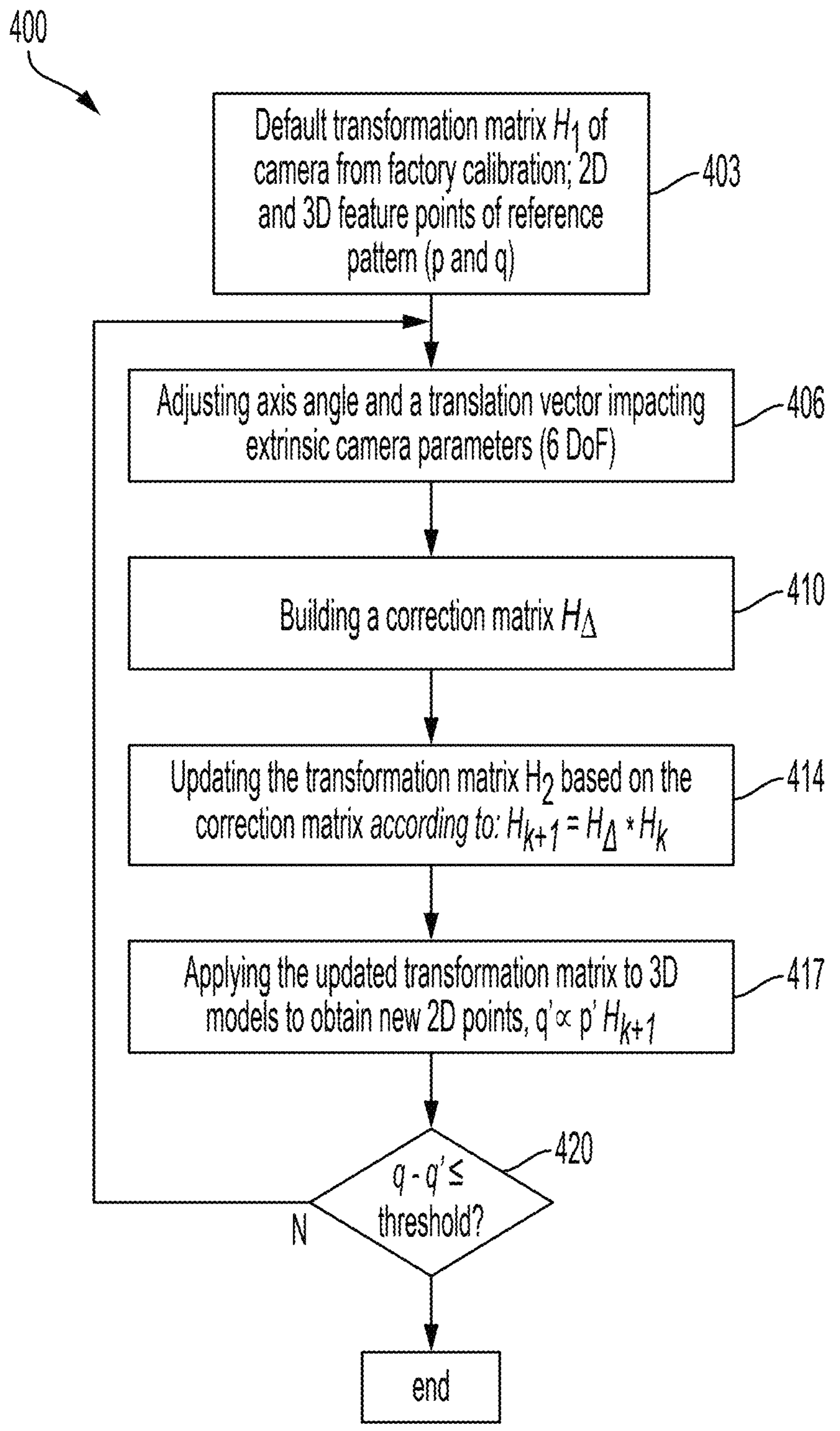
FIG. 4 is an exemplary diagram illustrating a calibration method for the exemplary camera of FIG. 1 according to an embodiment.

FIG. 4 is an exemplary diagram illustrating the field calibration method 400 for the exemplary camera 100 of FIG. 1 according to an embodiment. In some embodiments, the field calibration method for e.g. recovery of camera position in 3D world by reference patterns (natural or artificial) is accomplished without using extrinsic and intrinsic camera parameters explicitly. That is, the field calibration method is performed without decomposition of camera parameters into intrinsic and extrinsic parts. The field calibration method may be performed by processing logic that may include hardware (processor, calibration unit 140, circuitry, dedicated logic, etc.) and software (such as is run on the hardware processor 110 or computer system 200), or a combination of both, which processing logic may be included in the calibration unit 140.

Referring to FIG. 4, in an initial step 403, there is obtained the camera devices default or "given" camera parameters. In some embodiments, the default camera parameters may be inherent in an initial calibration, projection or "transformation" matrix ("H0") that represents the plurality of default intrinsic and extrinsic camera parameters. In some embodiments, the camera is operated to obtain real world 3D feature points of an image obtained through the camera field of view (FoV) and are represented as feature points "p". Default 2D feature points of the camera image plane are represented as $q_0$, and desired 2D feature points are referred to as $q_K$.

In some embodiments, the 3D models or reference patterns may include but are not limited to stencils. In some embodiments, the 3D models or reference patterns may be any suitable reference including cage corners, stumps, marks, lines, boundaries. In some embodiments, the 3D models or reference patterns may be static, i.e., its position does not change. In some embodiments, the 3D models or reference patterns may be in motion. In such an embodiment, a first camera system (for e.g. a stereo system, where there are at least two cameras) is calibrated using the method described herein and is used to track a moving object to obtain the 3D position and/or trajectory parameters. This information may be used to perform a calibration of a second camera system, where the second camera system may be the same or different stereo system as the first camera system. In such an embodiment, the second camera system is also used to track the same moving object to obtain the camera parameters of the second camera system.

There is also provided a step of controlling the camera to update the camera parameters with a 3D space, which is represented as an updated transformation matrix $H_{k+1}$ based on the natural or artificial reference patterns described at step 406. This step includes updating of the extrinsic camera parameters having 6 DoF. At step 406, the camera with known or given intrinsic parameters (from the factory calibration) is manually calibrated by adjusting the camera parameters associated with a small axis-angle and/or a translation vector. In some embodiments, the adjustment impacts implicit extrinsic camera parameters having 6 DoF. Next, a manual aligning of obtaining 2D virtual image features (q2) may be performed with 2D image features of a reference image (q1) by applying one or more corrections matrix ($H_\Delta$) to the plurality of the implicit camera parameters of the transformation matrix $H_k$, thereby obtaining the updated transformation matrix $H_{k+1}$ and in turn calibrating the camera. As described above, the camera calibration is performed without the decomposition of the camera parameters into explicit intrinsic and extrinsic parts. In this embodiment, the 2D virtual image features (q2) and 2D image features of the reference image (q1) are represented in pixel coordinates.

Continuing at step 410 of FIG. 4, based on the manual aligning as performed during the calibration at step 406, the processor may build at the camera, a correction matrix, "$H_\Delta$". Subsequently at step 414, the built correction matrix HA is applied at step 410 to the initial transformation matrix $H_k$ associated with the default camera parameters, to obtain an updated matrix $H_{k+1}$ associated with updated camera parameters according to the following equation (8):

$$H_{k+1} = H_\Delta H_k \tag{8}$$

Further, according to step 417 of FIG. 4, once the updated matrix $H_{k+1}$ is obtained at step 414, the updated matrix $H_{k+1}$ is subsequently applied to 3D models, where new 2D points may be obtained according to the following: $q_{k+1} \propto pH_{k+1}$, where new 2D points (camera position) are obtained from the updated homography matrix $H_{k+1}$. As 3D points p are static, 2D points $q_k$ are changing according to $H_k$ and converging to desired $q_K$ by tuning $H_{k+1}$ with $H^\Delta$.

Continuing to step 420 of FIG. 4, a determination is made as to whether the 2D image features (q) and 2D image features points of the virtual reference image (q') are equal or below some target threshold number of pixels. In other words, it is determined whether the difference between a 2D position (q) evaluated using the current transformation matrix $H_k$ and a desired 2D position (q') obtained from updated correction matrix $H_{k+1}$, i.e., the quantity $|q-q'|$ is less than or more than a threshold value "threshold". In an embodiment, the threshold value is represented by a distance in pixels, e.g., one (1) pixel and is alternatively referred to as a "reprojection error".

If, at step 420, it is determined that the quantity $|q-q'|$ is greater than a predefined threshold value, for e.g., greater than one pixel, then the method 400 repeats by returning to step 406 and all steps 406, 410, 414, 417, and 420 are repeated. In some embodiments, the steps of method 400 are iterative and repeated until such time when the quantity $|q-q'|$ is equal to or less than the threshold value, for e.g., ≤1 pixel, at which time the method 400 terminates as these 2D points are considered "in place". Following this, the camera is deemed to have been fully calibrated and is ready to be used for measurement purposes. The 2D feature points $$\overrightarrow{q_n} = \{q_{nx}, q_{ny}, 1\}$$

are computed using the obtained correction transformation matrix $H_{k+1}$ and the set of feature points $$\overrightarrow{p_n} = \{p_{nx}, p_{ny}, p_{nz}\}$$

in 3D (Cartesian) coordinate space according to eq. 2. The computed $$\overrightarrow{q_n} = \{q_{nx}, q_{ny}, 1\}$$

approximately yield the 2D position.

In an embodiment, an automatic camera calibration correction i.e. second stage calibration may be performed. The calibration computation method is described as follows. Solution for correction matrix $H_\Delta=\{\Delta r_k; \Delta s_k\}$ is determined from a system of linear equations:

$$(p\Delta r_k + \Delta s_k)r_k \times q_K = -(pr_k + s_k) \times q_K \tag{9}$$

where equation (9) is derived from projection constraint described in equation (10)

$$q_K \propto pH_{k+1} = pH_\Delta H_k = (pr_{\Delta,k} + \Delta s_k)r_k + s_k \tag{10}$$

An angle approximation: $r_{\Delta,k} \cong (I+\Delta r_k)$ is applied to generate a system of linear equations (approximate), where "I" is an identity matrix i.e. unit 3×3 matrix. A valid (orthonormal) rotation matrix $r_{\Delta,k}$ can then be constructed from obtained $\Delta r_k$ by applying Cayley formula and then apply $H_\Delta=\{\Delta r_k; \Delta s_k\}$ to obtain updated 2D points $q_{k+1}$ c $pH_{k+1}$ (using eq. (2). This procedure is repeated till the value of $|q_{k+1}-q_K|$ is within the threshold. $r_{\Delta,k} \sim I+\Delta r_k$, where $\Delta r_k$ is a skew symmetric matrix. Then, setting k=0, where k is an iteration counter, then the $H_k$ is initially provided by the following equation (11):

$$H_k = H, H_k \equiv \{r_k, s_k\}. \tag{11}$$

In some embodiments, the method subsequently performs the following steps:

1. solving $(p\Delta r_k+s_{\Delta,k})\cdot(q\times r_k)=(q\times(pr_k+s_k)$ for $\Delta r_k$ and $S_{\Delta,k}$ where $r_k$ represents a change in rotation and $S_k$ represents a change in camera translation;
2. assigning $H'=H_k$ if $\Delta r_k$ and $s_{\Delta,k}$ are small and then stop;
3. otherwise, building a valid $r_{\Delta,k}$ from $\Delta r_k$ (e.g., using half angles, Cayley formula in the event that the value does not converge. This is to avoid the use of polynomial equations); and
4. updating $H_{k+1}=\{r_{k+1}=r_{\Delta,k}r_k, s_{k+1}=s_{\Delta,k}r_k+s_k\}$, k=k+1 and repeat.

In an embodiment, the method solves a system of linear equations where the relation is between 3D points in a scene and their projection onto a camera's 2D the image plane such that the method solves a set of variables using the DLT method from the set of similarity relations: $q \propto p\, H'$ where q (2D points) and p (3D points) are known vectors, where "∝" denotes proportional to, and H' is a matrix (or linear transformation) which contains the unknowns to be solved. According to this embodiment, a 2D camera position consisting of $q_x$ and $q_y$ from the transformation matrix H' is obtained.

Figure 5A:
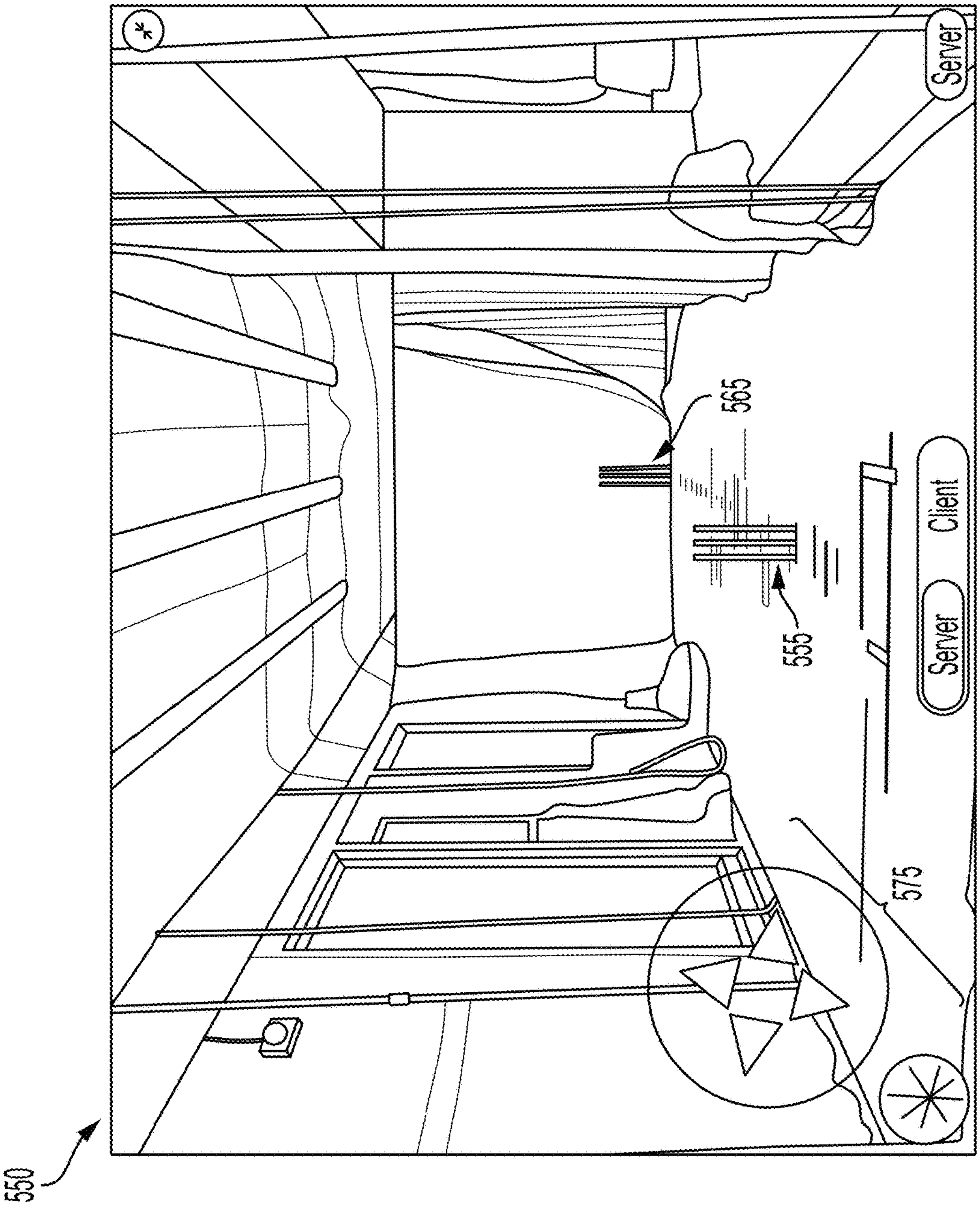
FIG. 5A depicts a method of conducting an on-site or field calibration of exemplary camera device in an example processing step of the calibration method according to an embodiment.

FIG. 5A depicts an exemplary environment 550 in which method according to one embodiment of the present disclosure is applied for conducting an on-site calibration (field calibration) of exemplary camera device 100 in an example second stage of calibration process. The view shown in FIG. 5A represents the image at a camera viewer. As shown in FIG. 5A, the camera calibration unit configures the camera to generate a virtual reference image 555 which, for camera calibration at step 406 of FIG. 4, is controllable for translational and rotational movement to align with a corresponding physical real world object 565 in the camera view for an affine correction. In an embodiment, the camera includes a physical directional button(s) or a manipulable "joystick" 575, which is manipulated by a user to move the virtual reference image 555 such that the virtual stumps 555 match the physical stumps 565, i.e., are aligned within a threshold distance (q− q'). The movement/alignment data obtained from the aligning of the calibration reference image 555 to the physical real world object 565 in the camera field of view is an offset correction that is used to generate new/updated extrinsic parameters of the camera.

In an embodiment, the method described in FIG. 4 recovers camera position in 3D world by reference patterns 565, i.e., a stump or a wicket, without using extrinsic and intrinsic camera parameters explicitly, i.e., without decomposition of camera parameters into intrinsic and extrinsic parts. In an embodiment, natural or artificial reference patterns can be used to perform the affine correction. Artificial reference patterns 565 can include other types of physical calibration objects, e.g., a marker, corner of a cage and so forth.

Figure 5B:
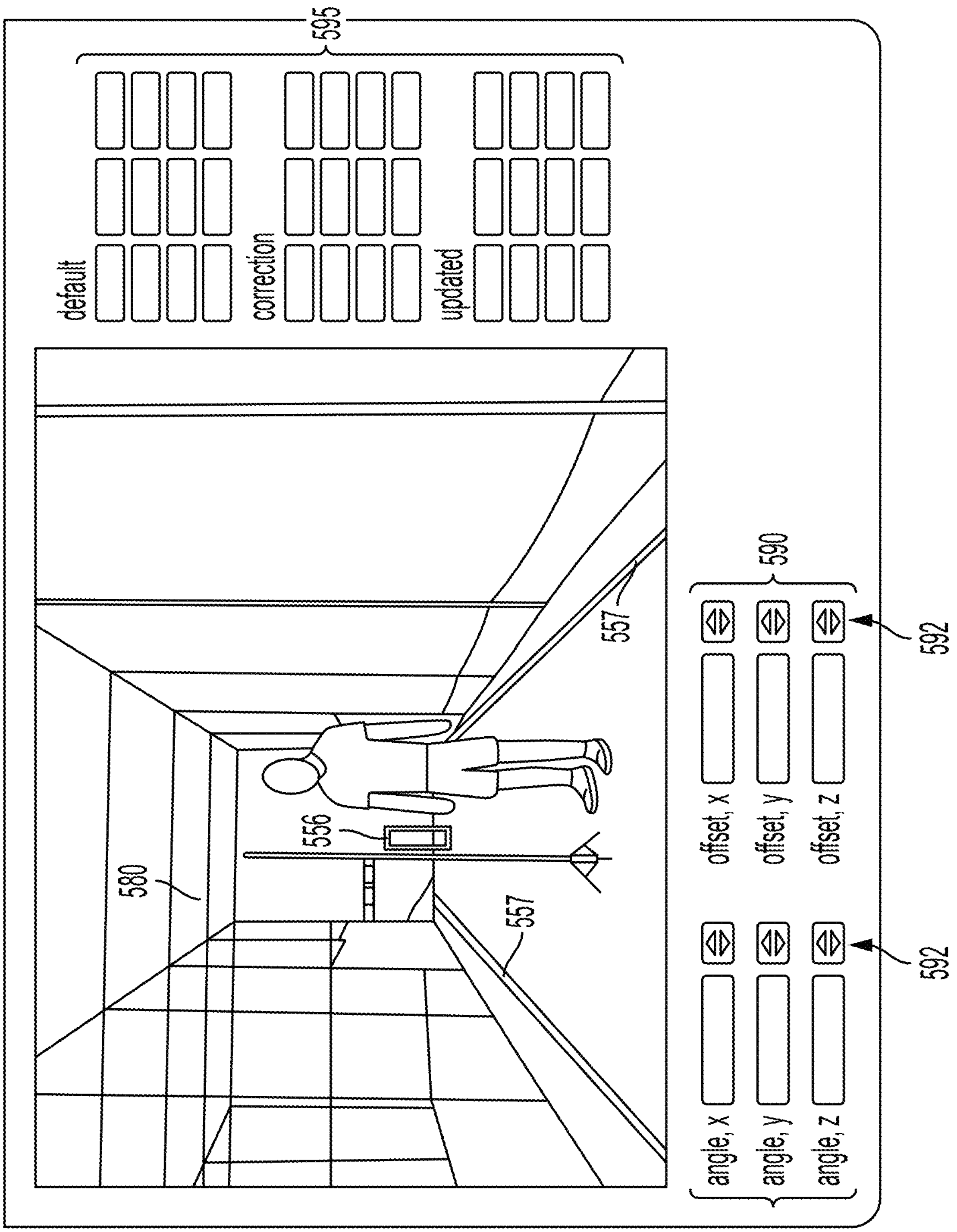
FIG. 5B depicts a further method for field calibration/correction in an example processing step of the calibration method according to an embodiment.

FIG. 5B depicts a further method for field calibration/correction. In an example sports cage 580 shown in FIG. 5B, the camera viewer presents virtual reference image as marks 556, e.g., marking a geometric shape such as a square, which can be a reference used for calibration. Other example of virtual references can include markings for corners of a cage (e.g., a batting cage), lines indicated as field line markings 557, field markings, and so forth. The camera includes physical directional button(s) 592 or a manipulable "joystick" (not shown) controllable for adjusting the translational (e.g., offset) and rotational (e.g., angle) parameters 590 associated with the movement of the reference markings 556, 557 when performing a calibration. The movement of the virtual reference calibration markings 556, 557 in the camera view align with a corresponding physical real world object(s) in 3D space represented, e.g., by orthogonal x, y, z directions as in a Cartesian coordinate system, for an affine correction thereby impacting 6 DoF and updated extrinsic camera parameters are thus obtained.

Additionally, shown in the camera view of FIG. 5B, homographic matrix values 595 for default ($H_n$), correction ($H_\Delta$) and updated matrices ($H_{n+1}$) for each calibration. From the updated homographic matrix values 595, the camera position in 3D world is recovered without using intrinsic and extrinsic camera parameters explicitly, i.e., without decomposition of camera parameters into intrinsic and extrinsic parts.

Other examples of reference markings include checkerboards, AprilTag, etc. and the calibration apparatus described in pending U.S. patent application Ser. No. 18/527,245 filed on Dec. 2, 2023, as well as a moving object including a ball. Natural patterns are known objects with a-priori placement with respect to camera. That is, in the first stage calibration, the relative position of the patterns to camera is known (a-priori). The parameters of the camera are recovered by the DLT method as described above, without decomposition of the camera parameters into intrinsic and extrinsic parts.

Thus, referring to the method 400 of FIG. 4, there is provided a two-stage calibration process, wherein a first stage is the recovery of implicit camera parameters using the DLT to recover 11 DoF parameters (e.g., implicit 6 DoF extrinsic and 5 DoF intrinsic). Then, at step 410, the second stage of the calibration requires an on-site affine correction, without altering implicit intrinsic parameters. This on-site correction assumes the following: the implicit intrinsic parameters of the camera do not change, i.e., the focal length, distortion profile, etc. remain the same; and only translation and/or rotation of camera with respect to world coordinate has changed. Thus, the extrinsic 6 DoF parameters are changed implicitly, without decomposing of combined set of calibration parameters (11 DoF) into intrinsic (5 DoF) and extrinsic parts (6 DoF).

In an embodiment, to extend a depth of focus along a field, e.g., of a stadium, the system further provides support for tilted lenses by performing a lens tilt calibration method such as that described in Scheimpflug principle by an implicit, unspecified model, of intrinsic camera parameters.

Measurements

The exemplary camera system of FIG. 1 is further configured as an object measurement system applicable to recover 3D world object positions by using stereo (two or more) cameras without decomposition of camera parameters into intrinsic and extrinsic parts. That is, according to embodiments herein, a measurement system and method for tracking objects is provided. In an embodiment, object tracking measurements include a hard-synchronization, and soft-synchronization parameter processing to recover projectile trajectories by a regularized high order trajectory model by partially overlapping or non-overlapping by field of view (FOV) stereo cameras for e.g. two or more without decomposition of camera parameters into intrinsic and extrinsic parts. It is to be understood that each of the two or more cameras in the object measurement system may have been calibrated according to the method described herein.

Hard Sync

For hard-sync object tracking and measurement, the camera system of FIG. 1 is configured such that the cameras, e.g., one or more multiple cameras $\mathbf{100}_1$, $\mathbf{100}_2$, . . . , $\mathbf{100}_n$ use the same external VSync signal, with cameras hard wired by a general purpose I/O (GPIO) line, and where frames are captured synchronously with the same timestamp.

Figure 6:
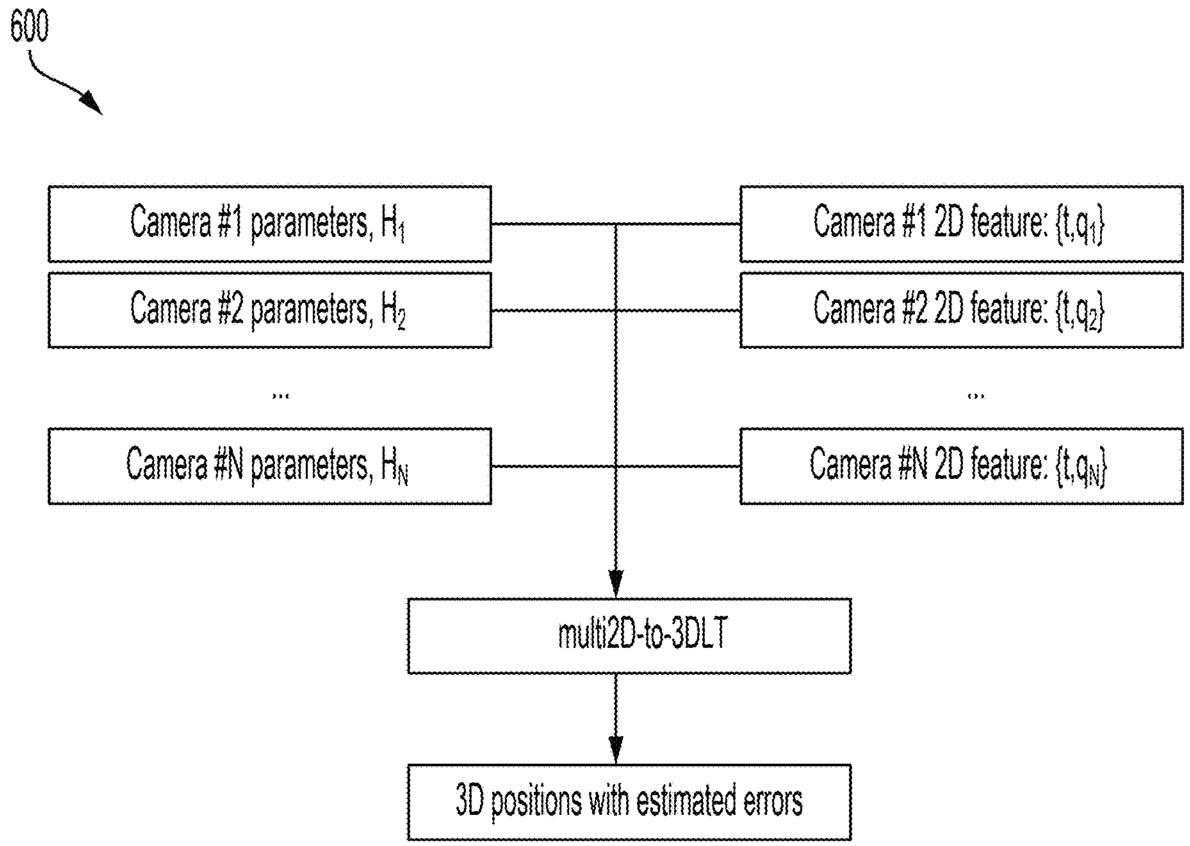
FIG. 6 depicts an application of the present disclosure to perform a measurement (tracking parameters) of a moving object in a 'hard-sync' method using synchronous operating cameras.

In some embodiments, FIG. 6 depicts an application to perform a measurement for e.g., tracking parameters of a moving object in a 'hard-sync' method 600. In some embodiments, the hard-sync method uses synchronous cameras that have been calibrated according to the method described herein. In some embodiments, the cameras have been calibrated without decomposition of the camera parameters into intrinsic and extrinsic camera parameters during the calibration. In some embodiments, the hard-sync method further utilizes a 2D-to-3D conversion algorithm. Given parameters from N cameras (1, 2, . . . , N), providing respective projection matrices $H_n$ where n=1, 2, . . . N, there are obtained corresponding tracked object features in 2D with each camera providing a 2D feature (t, q1), (t, q2), . . . , (t, qN). Then, applying a multi 2D-to-3D DLT, 3D positions of the moving object may be obtained with estimated errors.

As an example, given two cameras (camera "a" and camera "b") that have been calibrated according to the 2-stages calibration method described in the current disclosure, there are computed 2D feature points $q_{ax}$ and $q_{ay}$ for camera "a" and 2D feature points $q_{bx}$ and $q_{by}$ for camera "b" using the obtained correction transformation matrix H'.

Subsequently, these 2D image points may then be converted to corresponding 3D real world points. The measurement to obtain 3D points from 2D images is thus expedited as the measurement using the calibrated camera disclosed herein does not require a split of extrinsic and intrinsic parameters and the processing is not concerned with focal lengths, principal axes, lens tilts, stereo base distance.

Soft Sync

Figure 7:
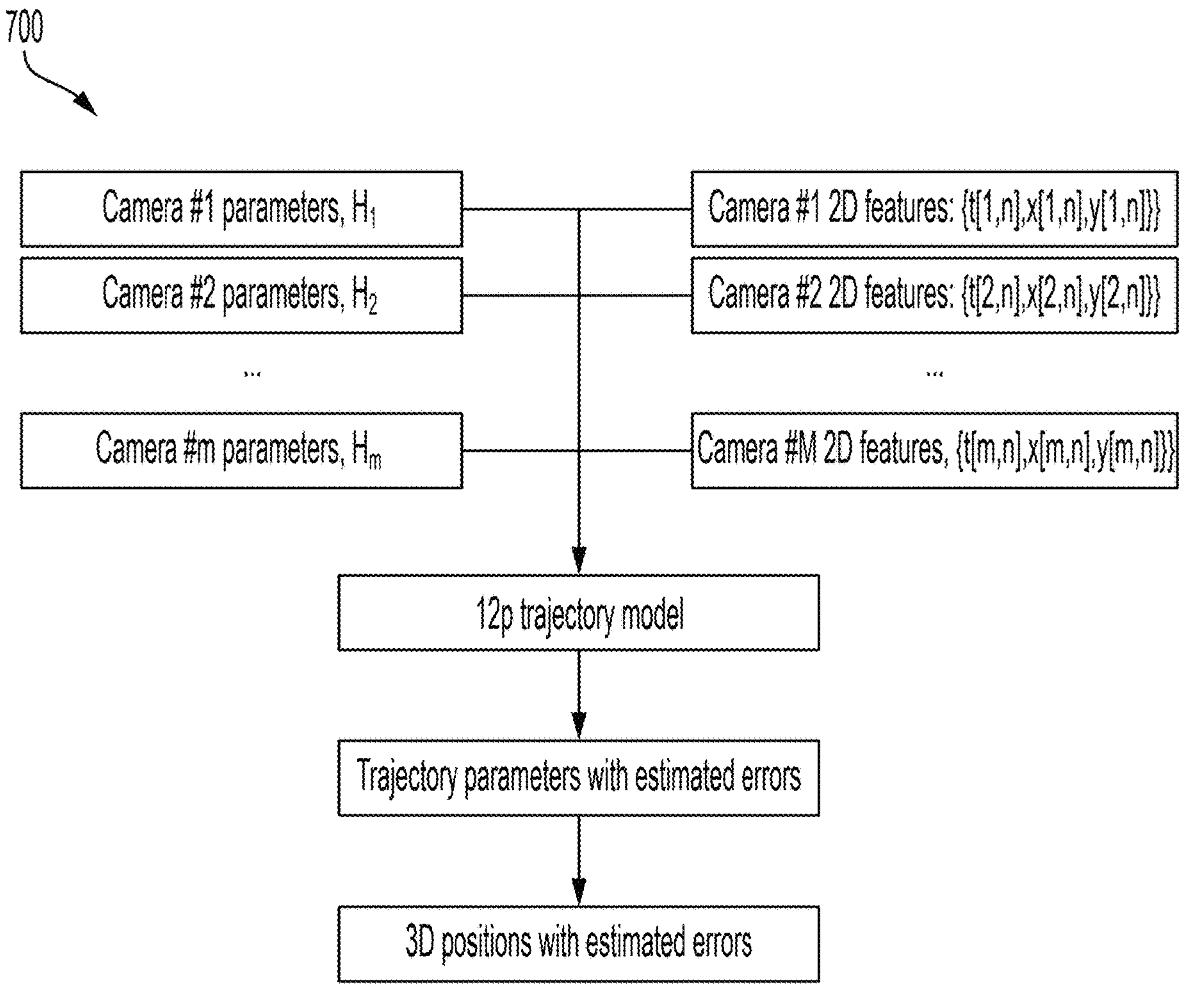
FIG. 7 depicts an application of the present disclosure to perform a measurement (tracking parameters) of a moving object in a 'soft-sync' method using asynchronous operating cameras.

In accordance with a further embodiment herein, FIG. 7 depicts an application of the present disclosure to perform a measurement for e.g., tracking parameters of a moving object in a 'soft-sync' method 700. In some embodiments, the soft-sync method uses asynchronous cameras that have been calibrated according to the method described herein. In some embodiments, the cameras have been calibrated without decomposition of the camera parameters into intrinsic and extrinsic camera parameters. In some embodiments, the soft-sync method utilizes non-overlapping FOV cameras. In some embodiments, the soft-sync method further utilizes a 2D-to-3D conversion algorithm. Given parameters from N cameras (1, 2, . . . , N), providing respective projection matrices $H_1$ where n=1, 2, . . . N, there are obtained corresponding tracked object features in 2D with each camera providing a 2D feature, e.g., {t[1,n], X[1,n], Y[1,n]} from camera 1, {t[2,n], X[2,n], Y[2,n]} from camera 2, . . . {t[m,n], X[m,n], Y[m,n]}) from camera m. Then, applying a 12p (twelve point) trajectory model, there are computed trajectory parameters with estimated errors from which 3D positions of the moving object are obtained with the corresponding estimated errors.

For soft-sync object tracking and measurement, the camera system of FIG. 1 is configured such that the cameras, e.g., one or more multiple cameras $\mathbf{100}_1$, $\mathbf{100}_2$, . . . , $\mathbf{100}_n$ capture image frames asynchronously. The processing, however, uses the same common time reference by clock. In such an embodiment, each camera is synchronized periodically by precision time protocol (PTP) and/or global position system (GPS). Each camera captures frames in a free run mode with its own interval VSync, thus frames' timestamps are different, but the reference time is the same within a tolerance defined or required by the measurement precision. In some embodiments, for a ball speed of 50 m/s and a distance measurement of 2.5 cm, the time synchronization tolerance is about 0.5 milliseconds (ms). As an exemplary embodiment, for the time tolerance of 0.5 ms and clock oscillators with an accuracy of 10 points per million (ppm), the cameras are to be synchronized every 50 seconds.

Figure 8A:
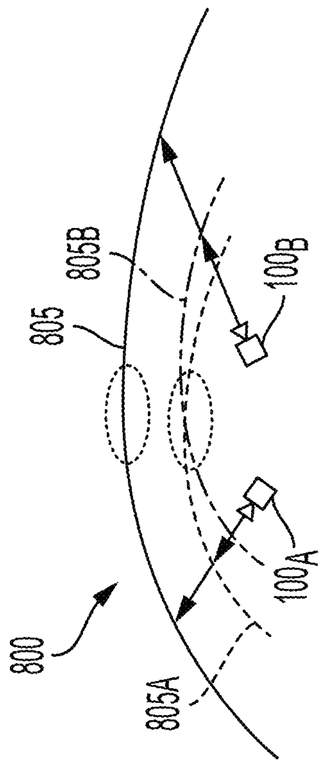
FIG. 8A conceptually depicts an implicit stereo representation for a given trajectory model that assumes a soft sync, according to an embodiment.

FIG. 8A conceptually depicts an implicit stereo representation 800 for a given trajectory model that assumes a soft sync. In this embodiment, there are recovered multiple cameras' asynchronous ("soft sync") ball trajectory parameters by trajectory stitching in parametric space. As shown in FIG. 8A, parameters are recovered from cameras $\mathbf{100}_A$ and $\mathbf{100}_B$ such that the trajectory is scaled until it stitches by shape and by time. The scaling is shown to obtain a trajectory and measurement of an object (e.g., 3D positions of a ball by time) along path 805. However, "soft-sync" processing obtains trajectory parameters with camera $\mathbf{100}_A$ frames along path 805A only and with camera $\mathbf{100}_B$ frames along path 805B. In some embodiments, paths 805A and 805B may overlap. In some embodiments, paths 805A and 805B may not overlap by cameras' view.

Figure 8B:
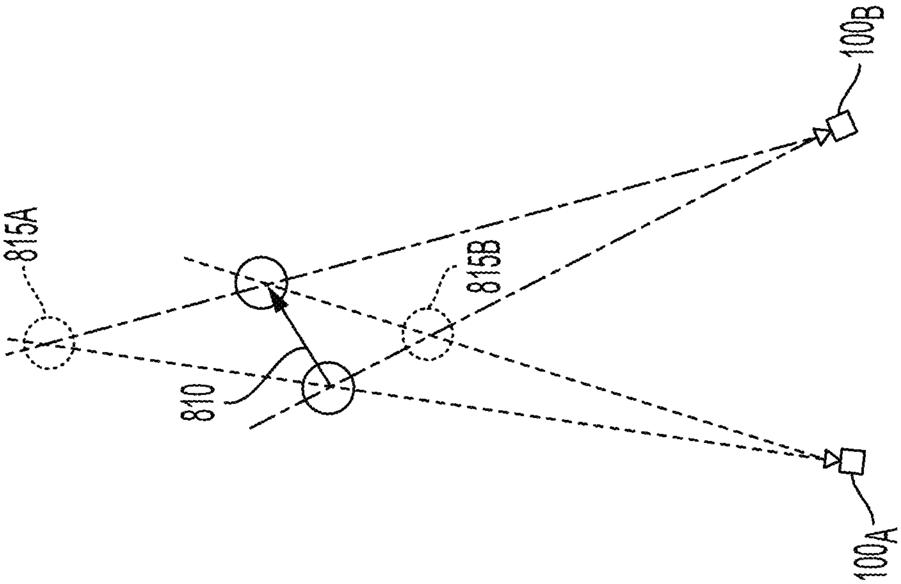
FIG. 8B depicts an application of an inappropriate triangulation ("hard-sync" method) over "soft-sync" data according to an embodiment.

FIG. 8B depicts inappropriate application of the triangulation ("hard-sync" method) over "soft-sync" data resulting in object's positions errors. As shown in FIG. 8B, frames are captured asynchronously by a free running camera (using an internal VSync signal), using the same time reference (PTP, GPS, power grid), but without exact matching of timestamps. The method chooses the closest frames by pairs to provide a ground truth object location(s), e.g., ball positions 810. The method estimates ball locations, e.g., a first location 815A based on results of an applied triangulation over the two close frames, e.g., taken by cameras $\mathbf{100}_A$, $\mathbf{100}_B$ or a second location 815B based on the triangulation. In an example implementation, there is chosen the closest camera image frames, wherein for 250 fps (two milliseconds) and ball speed of 50 m/s (or 200 fps and ball speed of 40 m/s), in which it results in object's position estimation error ("a shift").

This soft-sync method includes a feature such as: a 9p or 12p trajectory model, possibly non-overlapping views, e.g., using two, three or more cameras. Such an object tracking method can additionally be referred to as: non-overlapping stereo, multiple camera stereo, (implicit) trajectory stitching. This soft-sync method may be applied in cricket, baseball, football, etc.

In an embodiment, a "Triangulation" is applied to provide a 3D reconstruction for asynchronous (soft-sync) cameras with the common time reference and the synchronous frames captured by common VSync signal.

The trajectory is physically the same for all cameras. In this embodiment, it is further assumed that: all cameras share a common time reference, to provide proper timestamps even if their frames are asynchronous.

In an embodiment, a requirement for cameras' overlapping views can be relaxed by applying an "overlapping" in a parametric space. Two cameras might look in opposite directions and observe different part of the same trajectory. In some embodiments, sufficient base distance between cameras may be necessary.

A requirement for cameras to have a close focal length can therefore be relaxed. In some embodiments, the cameras may have significantly different focal length with small or no FOV overlapping.

In an embodiment, since pointwise triangulation methods are not used and are replaced with implicit "overlapping" of the trajectory in a parametric space, the requirement for "hard sync" can thus be relaxed.

No Sync

For no-sync, object tracking and measurement, the camera system of FIG. 1 is configured such that the cameras, e.g., one or more multiple cameras $\mathbf{100}_1, \mathbf{100}_2, \ldots, \mathbf{100}_n$ run asynchronously, using their own time reference by their own clock. In some embodiments, for no-sync, clock synchronization may be recovered (i.e. conversion from "no-sync" to "soft-sync") by post-processing using common events, by for e.g. video, audio, vibration or radar. Video events may be but are not limited to ball bouncing and IR flash. Audio and/or vibration events may be but not limited to ball hit and bouncing sound. Radar events may be but are not limited to ball release and/or ball bouncing. In some embodiments, clock synchronization may be recovered by flying ball. In such an embodiment, a specific configuration of cameras positions may be required for e.g. "in-plane" configuration where cameras are positioned side-by-side.

In an exemplary embodiment, for a camera system having two cameras i.e. camera A and camera B, the camera system is configured to determine the position of the object in motion. Camera A is configured to capture first and third images at first and third time points, respectively. Camera B is configured to capture second image at second time point. The third time point is after the first time point and the first time point is after the second time point. In another exemplary embodiment, the second time point is after the third time point and the third time point is after the first time point. Yet, in another exemplary embodiment, the third time point is after the second time point and the second time point is after the first time point. In some embodiments, cameras A and B are positioned at different locations.

Determination of Angular Size and Position of a Moving Object

In some embodiments, an apparatus is provided that determines angular size (denoted as a) of a moving object, e.g., a flying ball or a ball in flight. In some embodiments, the determination of the angular size is undertaken without the decomposition of camera parameters into extrinsic and intrinsic parameters explicitly. Further, the apparatus can provide information about the object's center in 3D world coordinates, distance between the object center and camera pinhole. Additionally, the apparatus can estimate the 3D position of the moving object.

In some embodiments, the apparatus includes a processor. The processor may be coupled with a memory device, which may store data associated with the processor's operations. In some embodiments, the image is captured by a camera coupled with the processor, such as a single camera or a mono camera that takes a snapshot or picture of an object, e.g., which may be in motion. The image is a two-dimensional (2D) image of the object in motion. In some embodiments, the image can be a frame among a sequence of frames (e.g., video frames) taken with a camera. For example, the camera can be coupled with the processor and configured to capture the image of the object in motion. In some embodiments, the camera has been calibrated without decomposing camera parameters into explicit extrinsic and explicit intrinsic camera parameters, for example, as described above with reference to camera calibration. In some embodiments, the camera may have been subjected to a factory calibration a described above with reference to camera calibration, where the extrinsic camera parameters are updated through an affine correction.

In some embodiments, the object is a 3D object. An example of an object is a ball such as a golf ball. Ball appearance on image (i.e., projection) depends on ball orientation by spin and/or change of the angle of view (AOV) of flying ball from the camera capturing the image.

In some embodiments, the apparatus uses $$H_R^T H_R = K^T K$$

effectively without any guesses about the intrinsic model and without the decomposition of the projection matrix into extrinsic and intrinsic parameters explicitly.

Given two image points on the object in the image $\vec{q}_1$ and $\vec{q}_2$, projections of two world points $\vec{p}_1$ and $\hat{p}_2$, at any depth, defined by projection matrix H: $\vec{p}_1 H \propto \vec{q}_1$ and $\vec{p}_2 H \propto \vec{q}_2$, the apparatus finds an angle between $\vec{p}_1 - \vec{p}_c$ and $\vec{p}_2 - \vec{p}_c$ vectors, where $\vec{p}_c$ is the camera position. In some embodiments, the two image points include two 2D perimeter points on the moving object.

As described herein, the homography matrix is defined as H=CK; with $C=\{R; \vec{s}\}$; $H=\{RK; \vec{s}K\}$; $H_R \equiv RK$; $H_s \equiv \vec{s}K$. The apparatus does not use decomposition, which means that the apparatus does not obtain rotation matrix (R) and translation vector (s) directly. Thus, the apparatus uses their $H_R$ and $H_s$ versions, where $H_R$=RK referring to combination of rotation matrix (R) and intrinsic matrix (K). $H_R$=RK is also referred to as rotation component of the homography matrix. Similarly, $H_s$=sK, being combination of translation vector (s) and intrinsic matrix (K) is referred to as translation component of the homography matrix.

For clarity, the homography matrix can be represented as follows:

$$H = \begin{bmatrix} H_R \\ H_s \end{bmatrix} = \begin{bmatrix} H_{R_{xx}} & H_{R_{xy}} & H_{R_{xz}} \\ H_{R_{yx}} & H_{R_{yy}} & H_{R_{yz}} \\ H_{R_{zx}} & H_{R_{zy}} & H_{R_{zz}} \\ H_{s_x} & H_{s_y} & H_{s_z} \end{bmatrix}$$

Camera position can be defined as $$\vec{p}_c = -\{\vec{s}K\}\{RK\}^{-1} = -\vec{s}R^T = -H_s * H_R^{-1}.$$

Referring to the equation above, camera position can thus be determined based on the rotation component and the translation component of the homography matrix. In some embodiments, the camera position is camera position in a 3D world coordinate system (termed as "3D camera position"). Projections:

$$\vec{p}_1 - \vec{p}_c \propto \vec{q}_1 H_R^{-1}; \vec{p}_2 - \vec{p}_c \propto \vec{q}_2 H_R^{-1}; \text{ or}$$

$$\vec{p}_1 - \vec{p}_c = k_1 \vec{q}_1 H_R^{-1}; \vec{p}_2 - \vec{p}_c = k_2 \vec{q}_2 H_R^{-1}.$$

Figure 9:
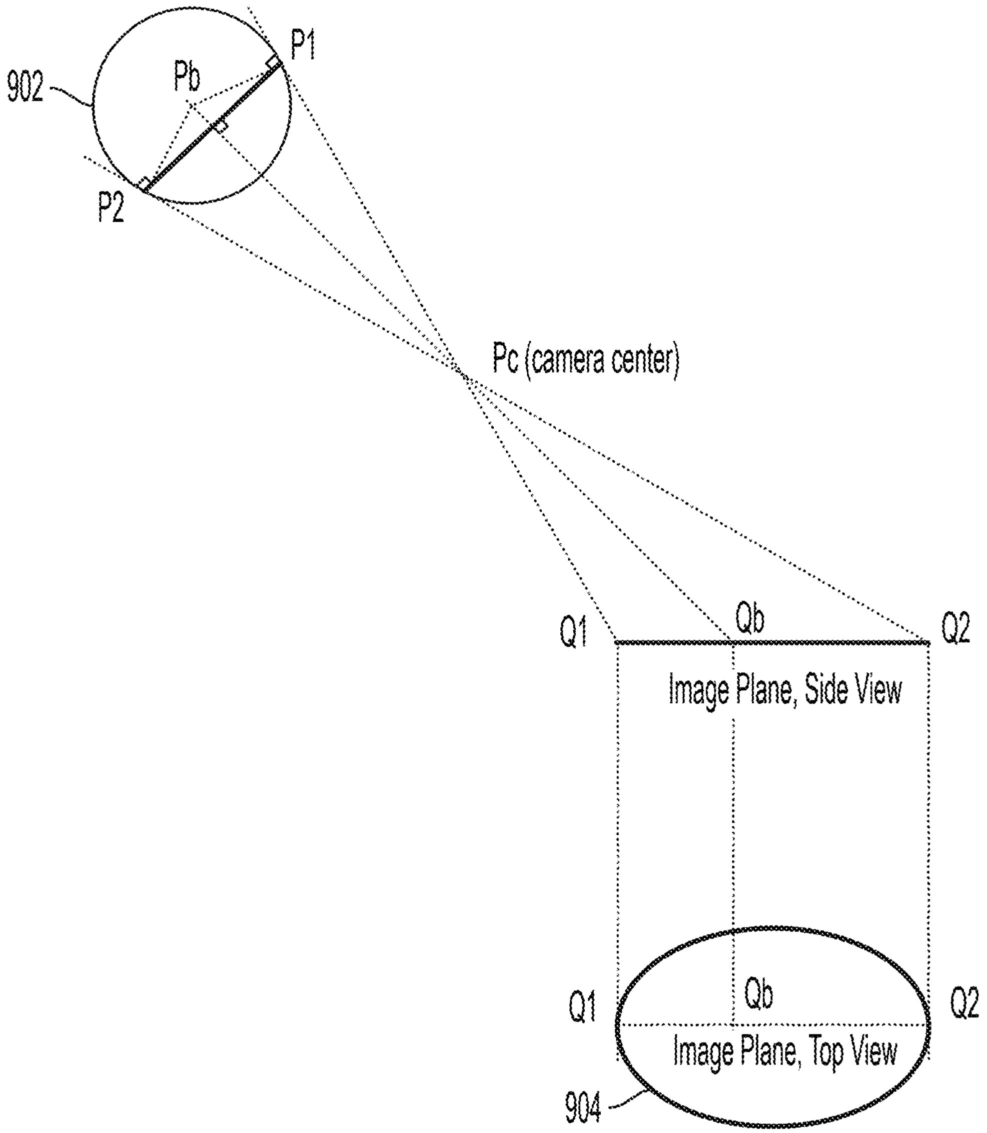
FIG. 9 shows a projection of a spherical ball onto a camera image, which appears as an ellipse, in some embodiments.

FIG. 9 illustrates an exemplary projection of a spherical ball onto the camera image where it appears as an ellipse, in some embodiments. P1 and P2 are perimeter points on spherical ball, generally, $P_i$ denote perimeter points on spherical ball 902. Q1 and Q2 are perimeter points on ellipse 904, generally Qi denote perimeter points on ellipse or object, generally, in the image. $P_b$ is the center of spherical ball 902. $Q_b$ is the center of 2D projection of ball in the image (appearing as an ellipse 904). Note that projection of the spherical ball center in the world coordinate onto the image is not the center of the ellipse, it is the focus of the ellipse, one of two.

In some embodiments, 2D perimeter points of the moving object are determined as follows. The apparatus detects a moving object, e.g., a flying ball from the image. In some embodiments, the object detected in the image has 2D perimeter points, where each of the 2D perimeter points has x- and y-components ($q_x$, $q_y$). In some embodiments, two, three or more 2D perimeters points are detected from the image. In some embodiments, a suitable background subtraction method with thresholding can be applied to determine one or more 2D perimeter points of the moving object in the image. As used herein, image coordinates are in 2D coordinate system and actual ball (or object) coordinates are in 3D coordinate system.

Back-Projection to 3D Conic Section

The apparatus converts all perimeter points into homogeneous matrix [$q_x$ $q_y$ 1], and transforms 2D image points into corresponding 3D points on a cone-like shape. In some embodiments, the conversion or transformation of the 2D image points into the corresponding 3D points on the 3D conic section uses rotation component of the homography matrix ($H_R$). In some embodiments, the 3D points on the 3D cone $p_{cone}$ pass through camera's center $p_c$ and perimeter of ball.

$$\overrightarrow{p_{cone}} = [\overrightarrow{p_x p_y p_z}] \propto [\overrightarrow{q_x q_y} 1] * H_R^{-1}$$

In some embodiments, $H_R$ can be obtained from the calibration without decomposition of extrinsic and intrinsic parameters explicitly as described herein. Since $H_R$=RK, this operation involves mapping the image pixel into a ray direction in 3D world coordinate system, representing the direction from the camera center over the 3D point. In some embodiments, the operation is performed without decomposing the homography matrix into C and K explicitly.

Normalized 3D Conic Section

By normalizing the 3D points on the 3D cone or conic section, $\overrightarrow{p_{cone}}$, unit vectors from camera center $\vec{p}_c$ to spherical ball surface $\vec{p}_i$ can be obtained as follows:

$$\overrightarrow{p_{norm}} = \frac{\overrightarrow{p_{cone}}}{\|\overrightarrow{p_{cone}}\|}, \text{ where}$$

$$\|\overrightarrow{p_{cone}}\| = \sqrt{p_x^2 + p_y^2 + p_z^2}.$$

Unit Vector from Camera's Center to Spherical Ball Center

The following illustrates determining a unit vector from camera's center $p_c$ to spherical ball center $p_b$. Covariance matrix C can be computed as follows:

$$C = \langle (\overrightarrow{p_{norm}} - \vec{\mu})(\overrightarrow{p_{norm}} - \vec{\mu})^T \rangle,$$

where $\vec{\mu} = \langle \overrightarrow{p_{norm}} \rangle$ being the average of $\overrightarrow{p_{norm}}$. This covariance matrix summarizes the distribution of normalized 3D rays. In some embodiments, as the normalized 3D points on the cone are unit vectors with the same origin, where all points lie on the circle. The covariance matrix represents the spread of these points around the circle. The smallest eigenvalue's eigenvector of the covariance matrix points in the direction where the normalized 3D points vary the least.

Eigenvector $\vec{c}_0$ corresponds to minimal eigenvalue, and $\vec{c}_0$ is defined as normalized unit vector, a vector that points from camera's center toward the center of the ball. In some embodiments, $\vec{c}_0$ is orthogonal to 3D point cloud of normalized projection of 2D perimeter points. In some embodiments, suitable methods including Singular Value Decomposition (SVD) or Rayleigh Quotient can be used to find the smallest eigenvalue eigenvector $\vec{c_0}$ of the covariance matrix.

Further, $\vec{c_0}$ can be projected from camera coordinate system into world coordinate system (this is termed as transformed principal direction).

$$\vec{p_b} - \vec{p_c} \propto \vec{c_0}$$

where, $\vec{p_b}$ is ball's 3D center in 3D world coordinate system, $\vec{p_c} = -H_s * H_R^{-1}$ defining camera position, $\propto$c means that $\vec{c_0}$ is defined up to the scale that is to be defined.

To define the scale of $\vec{c_0}$, range or radial distance from the camera to the ball is determined using the angular size and real dimension of the ball as will be described below. In some embodiments, the principal direction to the center of the ball can be determined based on the normalized 3D points on the 3D conic section.

In some embodiments, 2D ball center $q_b$ can be determined based on the rotation component of the homography matrix and the principal direction to the center of the object. 2D ball center $q_b$ can be determined as follows:

$$\vec{q_b} \propto \left(\overrightarrow{c_{0_{world}}} - \vec{p_c}\right) * H_R$$

$$\vec{q_b} \propto \vec{c_0} * H_R$$

In some embodiments, angular size ($\alpha$) of the object can be determined as follows.

Angle to each of the 3D points ($\theta$) is determined, based on the normalized 3D points on the 3D conic section and the principal direction to the center of the object, as follows:

$$\theta_i = \arccos\left(\vec{c_0} * \overrightarrow{p_{norm_i}}\right)$$

Since $\vec{c_0}$ and $\sqrt{p_{norm_i}}$ are both unit vectors, the dot product of these two will give $\cos(\theta_i)$, where $\theta_i$ represents the angle between the vectors $\vec{c_0}$ and $\overrightarrow{p_{norm_i}}$. In some embodiments, angular size ($\alpha$) of the object can be determined, based on the angle to each of the 3D points:

$$\alpha = 2 * \langle\theta\rangle$$

where $\langle\theta\rangle$ refers to the mean value of $\theta_i$. As used herein, the angular size is defined as an angle formed between the 3D points in respect to the center of the camera.

In some embodiments, radial distance or range can also be computed as follows:

$$r = \frac{d/2}{\sin(\alpha/2)}$$

where d denotes actual diameter of real ball. For example, in the case of a golf ball, the diameter is around 1.68 inches (in) or 4.27 centimeters (cm) or more. As used herein, range or radial distance (r) refers to tangential distance to a circle or a ball, as also shown in FIG. 10 and FIG. 11.

Figure 10:
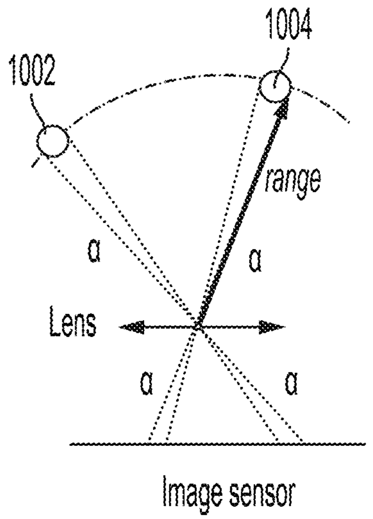
FIG. 10 is a schematic diagram illustrating range or radial distance of an moving object from an image sensor, in some embodiments.

FIG. 10 is a schematic diagram illustrating range or radial distance of a moving object from an image sensor, in some embodiments. Alpha ($\alpha$) is the angle, i.e., angular size between two vectors. A ball is shown in two different positions 1002 and 1004 where these positions do not describe the ball trajectory but they show the two different ball positions having the same angular size ($\alpha$).

Figure 11:
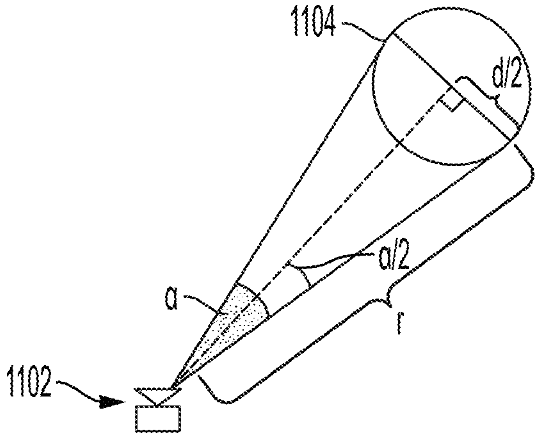
FIG. 11 is a schematic diagram showing the relationship between range and angular size of a moving object, in some embodiments.

FIG. 11 is a schematic diagram showing the relationship between range (r) and angular size ($\alpha$) of a moving object, in some embodiments. In the figure, alpha ($\alpha$) denotes the angular size of the moving object, d denotes the actual diameter of the moving object, and r denotes the radial distance or range from the camera 1102 to the moving object 1104.

3D ball center can be computed as follows:

$$\vec{p_b} = \vec{c_0} * r + \vec{p_c}$$

$\vec{c_0}$ is scaled with range r, and can be transformed into the world coordinate system by adding the camera position $\vec{p_c}$. Through this operation, the ball's 3D center in world coordinate system, $\vec{p_b}$ can be determined. Accordingly, 3D position of the ball can be determined.

As described above, the apparatus can include at least one memory device and at least one processor coupled with the memory device. The processor can be configured to receive an image of an object, the image being captured by a camera. The processor can also be configured to determine two image points on perimeters of the object in the image. The processor can also be configured to convert the 2D image points, using a rotation component of a homography matrix, into corresponding 3D points on a 3D conic section that passes through a center of the camera and the perimeters of the object. The processor can be further configured to normalize the 3D points on the 3D conic section. Additionally, the processor can be configured to determine a principal direction to a center of the object, based on the 3D points on the normalized 3D conic section. The processor can be further configured to determine 2D object center based on the principal direction and the rotation component of the homography matrix. In some embodiments, the processor can be configured to determine an angle ($\theta$) at each of the 3D points on the 3D conic section and the principal direction to the center of the object. The processor can also be configured to determine an angular size of the object, based on the angle at each of the 3D points, the angular size defining an angle formed between the 3D points in respect to the center of the camera. In some embodiments, the processor can be configured to determine a 3D position of the moving object based the range of the object, the principal direction to the center of the object and a position of the camera.

In some embodiments, the processor can be further configured to determine a radial distance or range of the object representing the length of a radius vector from the center of the camera to the object, based on the angular size. In some embodiments, the radial distance of the object is determined by dividing actual diameter of the object by the angular size.

In some embodiments, the camera has been calibrated as described herein, without decomposition into intrinsic and extrinsic camera parameters explicitly.

In some embodiments, the object is a 3D object for example a ball. In some embodiments, the ball is a golf ball. In some embodiments, the ball is a baseball. In some embodiments, the ball is a cricket ball.

Figure 12:
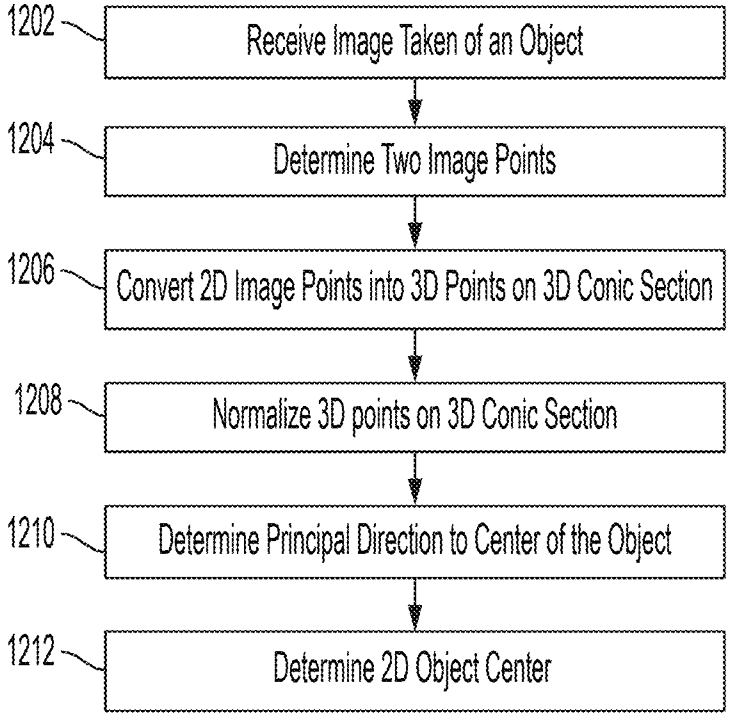
FIG. 12 is a flow diagram illustrating a method of determining an angular size of an object for determining a 3D position of the object, in some embodiments.

FIG. 12 is a flow diagram illustrating a method of determining an angular size of an object for determining a 3D position of the object, in some embodiments. The angular size or angular measurements are determined without the decomposition of camera parameters into extrinsic and intrinsic parameters. The method can be performed by an apparatus or a processor, which may be coupled with a camera, and that tracks an object in an image captured by the camera.

As shown in FIG. 12, at 1202, the method includes receiving an image of an object e.g. a moving object, the image being captured by a camera. At 1204, the method includes determining two-dimensional (2D) image points on perimeters of the object in the image. At 1206, the method includes converting, using a rotation component of a homography matrix, the 2D image points into corresponding three-dimensional (3D) points on a 3D conic section that passes through a center of the camera and the perimeters of the object. At 1208, the method includes normalizing the 3D points on the 3D conic section. At 1210, the method includes determining a principal direction to a center of the object, based on the normalized 3D points on the 3D conic section. At 1212, the method includes determining 2D object center, based on the principal direction and the rotation component of the homography matrix.

In some embodiments, the method can further include determining an angle at each of the 3D points, based on the normalized 3D points on the 3D conic section and the principal direction to the center of the object. The method can also include determining an angular size of the object, based on the angle at each of the 3D points, the angular size defining an angle formed between the 3D points in respect to the center of the camera. In some embodiments, the method can also include determining a 3D position of the object based on the range of the object, the principal direction to the center of the object and a position of the camera.

The method can also include determining a radial distance or range of the object representing the length of a radius vector from the center of the camera to the object, based on the angular size. In some embodiments, the method can include determining a 3D position of the object, based on the range of the object, the principal direction to the center of the object and a position of the camera. In some embodiments, the radial distance or range of the object is determined by dividing actual diameter of the object by the angular size. As described above, in some embodiments, the camera has been calibrated without decomposition into explicit intrinsic and extrinsic camera parameters. In some embodiments, the object is a 3D object for example a ball such as, but not limited to, a golf ball, a baseball, and a cricket ball.

In some embodiments, a computer readable storage medium storing a program of instructions executable by a machine to perform one or more methods described herein is also provided.

A computer storage medium or media includes one or more storage devices that collectively include machine readable code corresponding to instructions and/or data for performing computer operations specified in a given computer storage medium claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include, but are not limited to: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The specific embodiments of the present disclosure are described above, but various modifications to the specific embodiments are possibly implemented without departing from the scope of the present disclosure. However, it is apparent to a person of ordinary skill in the art to which the present disclosure pertains that various alterations and modifications are possible without departing from the nature and gist of the present disclosure. Therefore, the embodiments of the present disclosure are for describing the technical idea of the present disclosure, rather than limiting it, and do not impose any limitation on the scope of the technical idea of the present disclosure. Accordingly, the scope of the present disclosure should be defined by the following claims. All equivalent technical ideas should be interpreted to be included within the scope of the present disclosure.

What is claimed is:

1. An apparatus comprising:

at least one memory device; and at least one processor coupled with the memory device, the at least one processor is configured to:

receive an image of an object, the image being captured by a camera;

determine two-dimensional (2D) image points on perimeters of the object in the image;

convert using a rotation component of a homography matrix, the 2D image points into corresponding three-dimensional (3D) points on a 3D conic section that passes through a center of the camera and the perimeters of the object;

normalize the 3D points on the 3D conic section to obtain corresponding unit vectors such that a plane orthogonal to the center of the camera is formed;

determine a principal direction to a center of the object, based on the normalized 3D points on the 3D conic section; and determine 2D object center based on the principal direction and the rotation component of the homography matrix.

2. The apparatus of claim 1, wherein the at least one processor is further configured to:

determine an angle (θ) at each of the 3D points, based on the normalized 3D points on the 3D conic section and the principal direction to the center of the object; and determine an angular size of the object, based on the angle (θ) at each of the 3D points, the angular size defining an angle formed between the 3D points in respect to the center of the camera.

3. The apparatus of claim 2, wherein the at least one processor is further configured to:

determine a range of the object representing a length of a radius vector from the center of the camera to the object, based on the angular size.

4. The apparatus of claim 3, wherein the at least one processor is further configured to determine a 3D position of the object, based on the range of the object, the principal direction to the center of the object and a position of the camera.

5. The apparatus of claim 3, wherein the range of the object is determined by dividing a diameter of the object by the angular size.

6. The apparatus of claim 1, wherein the camera has been calibrated without decomposing intrinsic and extrinsic camera parameters explicitly.

7. The apparatus of claim 1, wherein the object is a ball.

8. The apparatus of claim 1, wherein the object is a golf ball.

9. The apparatus of claim 1, wherein the object is a baseball.

10. The apparatus of claim 1, wherein the object is a cricket ball.

11. The apparatus of claim 1, wherein the at least one processor is further configured to:

construct a covariance matrix based on the normalized 3D points on the 3D conic section; and determine a minimum eigenvalue's eigenvector of the covariance matrix;

wherein the at least one processor determines the principal direction to the center of the object based on the minimum eigenvalue's eigenvector of the covariance matrix.

12. A method comprising:

receiving an image of an object, the image being captured by a camera;

determining two-dimensional (2D) image points on perimeters of the object in the image;

converting using a rotation component of a homography matrix, the 2D image points into corresponding three-dimensional (3D) points on a 3D conic section that passes through a center of the camera and the perimeters of the object;

normalizing the 3D points on the 3D conic section to obtain corresponding unit vectors such that a plane orthogonal to the center of the camera is formed;

determining a principal direction to a center of the object, based on the normalized 3D points on the 3D conic section; and determining 2D object center based on the principal direction and the rotation component of the homography matrix.

13. The method of claim 12, further comprising:

determining an angle (θ) at each of the 3D points, based on the normalized 3D points on the 3D conic section and the principal direction to the center of the object; and determining an angular size of the object, based on the angle (θ) at each of the 3D points, the angular size defining an angle formed between the 3D points in respect to the center of the camera.

14. The method of claim 13, further including determining a range of the object representing a length of a radius vector from a center of the camera to the object, based on the angular size.

15. The method of claim 14, further including determining a 3D position of the object, based on the range of the object, the principal direction to the center of the object and a position of the camera.

16. The method of claim 12, wherein the camera has been calibrated without decomposition into explicit intrinsic and extrinsic camera parameters.

17. The method of claim 12, wherein the object is a ball.

18. The method of claim 12, wherein the object is a golf ball.

19. The method of claim 12, wherein the object is a baseball.

20. The method of claim 12, wherein the object is a cricket ball.

21. The method of claim 12, further comprising:

constructing a covariance matrix based on the normalized 3D points on the 3D conic section;

determining a minimum eigenvalue's eigenvector of the covariance matrix; and determining the principal direction to the center of the object based on the minimum eigenvalue's eigenvector of the covariance matrix.

22. A non-transitory computer readable storage medium storing a program of instructions, that when executed by a processor, perform operations, the operations comprising:

receiving an image of an object, the image being captured by a camera;

determining two-dimensional (2D) image points on perimeters of the object in the image;

converting using a rotation component of a homography matrix, the 2D image points into corresponding three-dimensional (3D) points on a 3D conic section that passes through a center of the camera and the perimeters of the object;

normalizing 3D points on the 3D conic section to obtain corresponding unit vectors such that a plane orthogonal to the center of the camera is formed;

determining a principal direction to a center of the object, based on the normalized 3D points on the 3D conic section; and determining 2D object center based on the principal direction and the rotation component of the homography matrix.

23. The computer storage readable medium of claim 22, wherein the operations further comprising:

constructing a covariance matrix based on the normalized 3D points on the 3D conic section;

determining a minimum eigenvalue's eigenvector of the covariance matrix; and determining the principal direction to the center of the object based on the minimum eigenvalue's eigenvector of the covariance matrix.

* * * * *